US008397844B2

(12) United States Patent
Vasant

(10) Patent No.: US 8,397,844 B2
(45) Date of Patent: Mar. 19, 2013

(54) APPARATUS AND SYSTEM FOR EFFICIENT AND MANEUVERABLE VEHICLE

(76) Inventor: Abraham Vasant, Livermore, CA (US)

( * ) Notice: Subject to any disclaimer, the term of this patent is extended or adjusted under 35 U.S.C. 154(b) by 1153 days.

(21) Appl. No.: 11/609,279

(22) Filed: Dec. 11, 2006

(65) Prior Publication Data
US 2007/0144799 A1  Jun. 28, 2007

Related U.S. Application Data

(60) Provisional application No. 60/749,346, filed on Dec. 9, 2005.

(51) Int. Cl.
*B60K 1/00* (2006.01)
(52) U.S. Cl. ...................................... 180/65.1
(58) Field of Classification Search ......... 180/65.1–65.8
See application file for complete search history.

(56) References Cited

U.S. PATENT DOCUMENTS

| | | | |
|---|---|---|---|
| 3,690,397 A | 9/1972 | Parker | |
| 4,227,589 A | 10/1980 | Chika | |
| 4,313,511 A * | 2/1982 | Soo Hoo | 180/21 |
| 4,313,517 A * | 2/1982 | Pivar | 180/216 |
| 4,476,954 A * | 10/1984 | Johnson et al. | 180/333 |
| 4,484,648 A * | 11/1984 | Jephcott | 180/210 |
| 4,775,021 A | 10/1988 | Marino | |
| 5,335,743 A * | 8/1994 | Gillbrand et al. | 180/178 |
| 5,343,974 A * | 9/1994 | Rabek | 180/216 |
| 5,445,233 A | 8/1995 | Fernie et al. | |
| 5,740,887 A * | 4/1998 | Unger et al. | 187/231 |
| 5,765,846 A * | 6/1998 | Braun | 280/124.103 |
| 2002/0038730 A1* | 4/2002 | Bidwell | 180/15 |
| 2005/0016780 A1* | 1/2005 | Richey et al. | 180/65.1 |

* cited by examiner

*Primary Examiner* — Katy M Ebner
(74) *Attorney, Agent, or Firm* — Kunzler Law Group, PC

(57) ABSTRACT

An apparatus and system are disclosed for a maneuverable vehicle. The apparatus is a vehicle that includes a frame configured to support the vehicle. The frame has a longitudinal axis and a lateral axis. The apparatus also includes a modular power pack removably coupled with the frame and configured to provide a driving force to the vehicle, first and second wheels attached to the modular power pack along the lateral axis, and third and fourth wheels attached to the frame along the longitudinal axis. The first, second, third, and fourth wheels may be arranged in a diamond shape. The system includes the apparatus and a single control apparatus coupled to the vehicle and in communication with a control computer. The single control apparatus may include a moveable steering wheel configured to control throttle, steering, and braking.

20 Claims, 25 Drawing Sheets

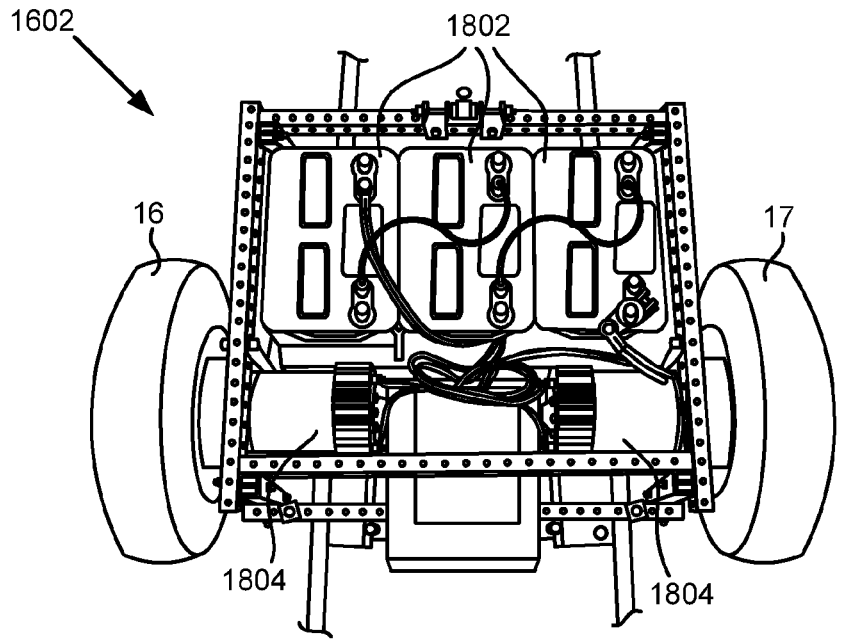
Figure 18a
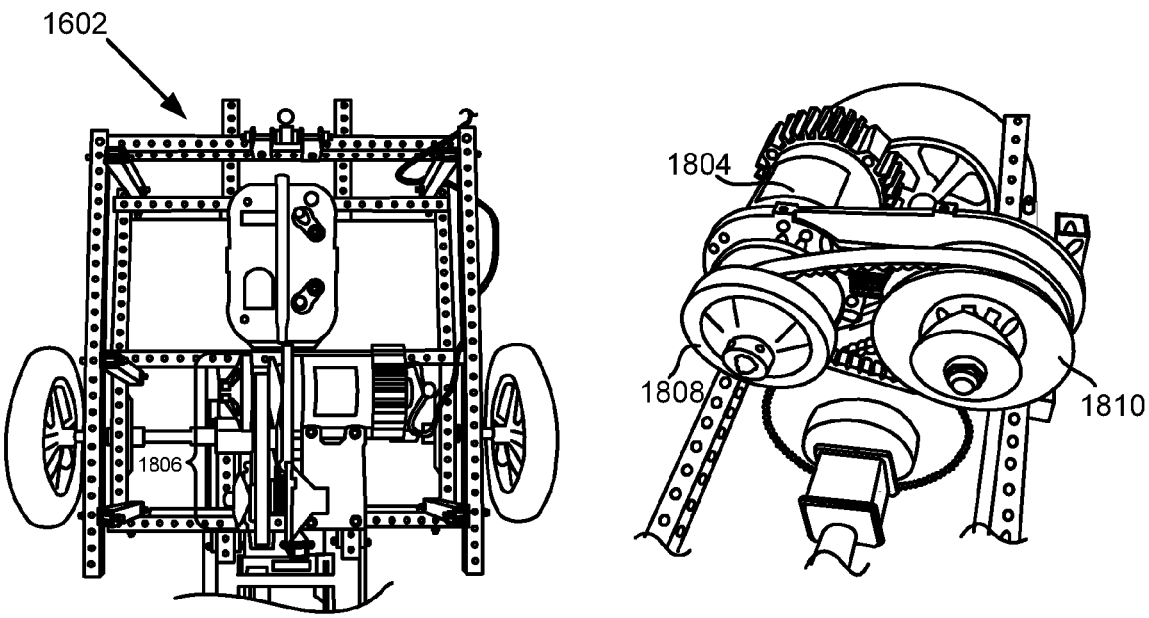
Figure 18b
Figure 18c

APPARATUS AND SYSTEM FOR EFFICIENT AND MANEUVERABLE VEHICLE

CROSS-REFERENCES TO RELATED APPLICATIONS

This application is a continuation-in-part of and claims priority to U.S. Provisional Patent Application No. 60/749,346 entitled "APPARATUS, SYSTEM, AND METHOD FOR EFFICIENT AND MANEUVERABLE VEHICLE" and filed on Dec. 9, 2005 for Abraham Vasant, which is incorporated herein by reference.

BACKGROUND OF THE INVENTION

1. Field of the Invention

The invention relates to powered vehicles for transportation uses.

2. Description of the Related Art

Small electric powered vehicles are fairly common in a variety of applications including golf carts, short-range delivery vehicles, campus and event transport. In each of these applications, the vehicle is a miniaturization of a standard four-wheeled road vehicle with a fairly standard provision of controlled electric motive, power to vehicle wheels. In that such vehicles are steered conventionally by turning two wheels mounted at the front end of the vehicle, their maneuverability is not significantly better than that found in many road vehicles. Wheelchairs have innate high maneuverability but are limited to use by a single person with a physical disability. They are also unsuitable to carry luggage or packages. Furthermore, wheelchairs are generally structured as a chair, with wheels at the end of each of the "legs" of the chair.

SUMMARY OF THE INVENTION

The present invention has been developed in response to the present state of the art, and in particular, in response to the problems and needs in the art that have not yet been fully solved.

The vehicle is a convenient, indoor or outdoor vehicle for one or two people with space for personal goods. The vehicle is most suited for adaptations for recreational use. It uses electric power for zero pollutant emissions, quiet operation, and a very low running cost. The vehicle is driven using a joystick and/or steering wheel and is able to turn on the spot.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIGS. 18a, 18b, and 18c illustrate embodiments of the power pack in accordance with the present invention;

DETAILED DESCRIPTION OF THE INVENTION

Figure 1:
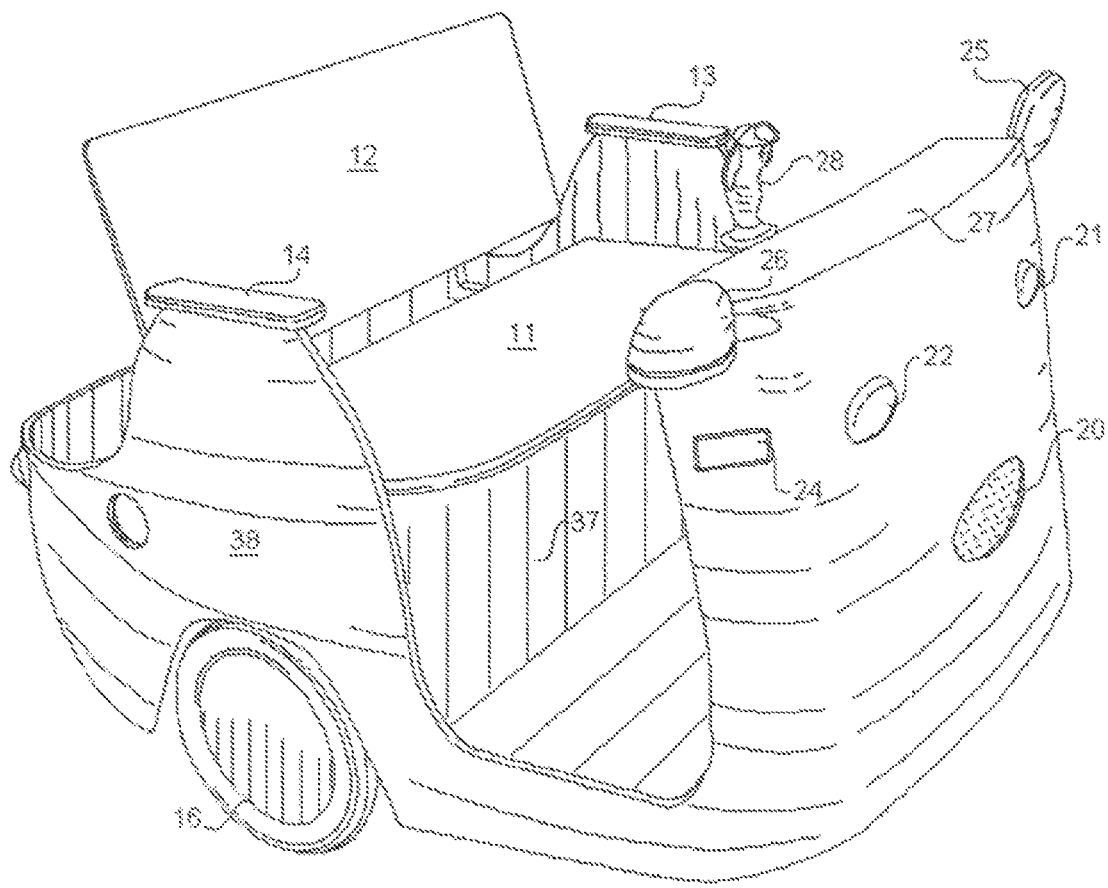
FIG. 1 is a front perspective view diagram illustrating one embodiment of a vehicle in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical modules of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
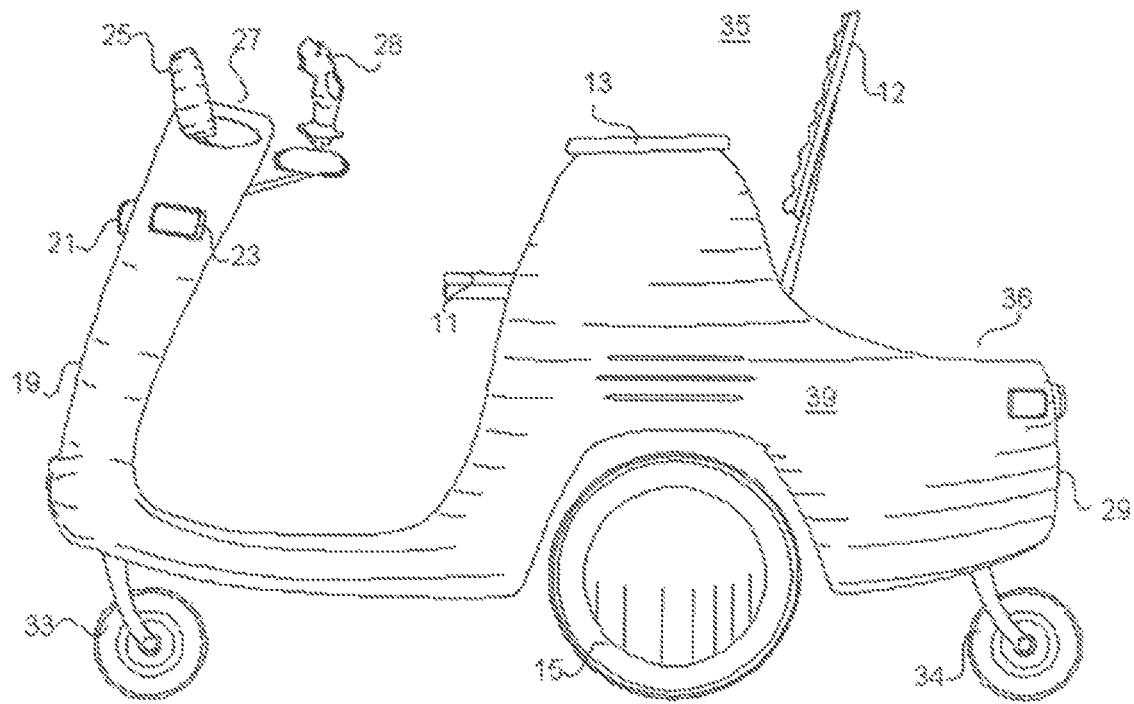
FIG. 2 is a side perspective view diagram illustrating one embodiment of a vehicle in accordance with the present invention.

One embodiment of the present invention is illustrated in FIG. 1 (front perspective view) and FIG. 2 (side view). In one embodiment, the plan wheel geometry of the vehicle is substantially a diamond form shown in FIG. 3.

In one embodiment, the vehicle has two transversely mounted, spring-suspended drive wheels 15, 16 that are mounted near its longitudinal center to bear most of the vehicle's weight. Two longitudinally separated wheels 33, 34 are mounted near the front and rear of the vehicle respectively to stabilize it. The arrangement with each of the front 33 and rear 34 wheels on the vehicle centerline enables the design to be made without prominent corners, contrasting with the case of a traditionally designed four-wheeled vehicle whose geometry results in corners which are often accident prone. The vehicle features a rounded shape, which enables negotiating tight spaces, reducing the possibility of collision damage to its corners. The vehicle includes a body 38 optionally composed of sheet metal, fiberglass, or thermoplastic panels mounted over a rigid frame 30 (shown in FIG. 3). In one embodiment, the body is made of a lightweight, rigid material. In another embodiment, not shown, the body panels may have fanciful shapes, for entertainment purposes.

In one embodiment, a seating platform 11 and backrest 12 is provided for one or more riders of the vehicle. In one embodiment, the seating platform 11 and backrest 12 may be padded, or may form a "bucket seat" or "love seat" for comfort. In one embodiment, armrests, left 13 and right 14 are provided for the comfort of the rider. A center armrest may be available in one embodiment, for two-person vehicles. The center armrest may be fixed, or may be moveable, to allow a single rider to sit in the center. In one embodiment, storage pockets are provided on the inside of each side panel below the armrests, below the seat and below the dashboard.

The vehicle is driven by two transversely mounted drive wheel assemblies, 15, 16, as shown. This drive-wheel assembly includes a wheel with a tire, mounted on left axle 17, right axle 18. Front wheel 33 and rear wheel 34 (shown in FIG. 2) are provided for pitch stability. In one embodiment, the front and rear wheels 33, 34 are castor wheels, or similar free-running wheels that are not powered, or driven.

FIG. 1 shows a front panel 19, made of reinforced material for impact resistance, designed to protect the internal electrical and dashboard electronic systems. The front panel 19 is designed both for utility and pleasing appearance. In one embodiment, the front panel 19 carries a left main light 21 and a right main light 22, and yellow turn signal lights 23 and 24. In one embodiment, the main lights 21, 22 can be switched to high beam or normal beam settings; and can also function as running lights. Also mounted in the front panel 19, behind grille 20, is a speaker, which serves the function of a vehicle horn and which can provide amplified sounds that include spoken words or simulated engine sound effects. In one embodiment, it can also function as a megaphone by directing the operator's amplified voice. In one embodiment, the rear-view mirrors 25 and 26 are adjustable. The dashboard 27 is explained with its functions in detail with respect to FIG. 11.

Operator control of the vehicle's movement is accomplished by means of a joystick 28 positioned in front of the operator. The functioning of the joystick 28 is described in more detail below.

FIG. 2 shows one embodiment of, a side view of the vehicle. At the rear of the vehicle are provided a set of lamps on the right side and left side. In one embodiment, there is a set of lamps for: brake (red), the reverse (white), turn (red), and running (red). In one embodiment, the vehicle includes a luggage space 36 is at the rear of the occupant's space 35. In one embodiment, the battery stack is found between the wheels below the seat 11. The joystick 28, positioned in front of the operator, provides for operator control in a specific manner selected by a drive mode selector 72 mounted on the dashboard 113 of the vehicle. In one embodiment, the joystick is mounted movably, to permit adjustment to the length of the user's arm.

The chassis design lends itself to a range of size and shapes of the exterior body design, can be easily adapted to include body shapes suitable for floats in street parades, and mobile objects far advertisements, mascots and characters found in theme parks.

The basic design characteristics are highly scalable. Using larger motors and larger chassis the physical size of the vehicle can be constructed to a much larger scale as desired, while the functional characteristics are essentially retained. Likewise the vehicle can be scaled dawn to a size of a child's riding toy vehicle with reduced speed and capabilities.

Figure 3:
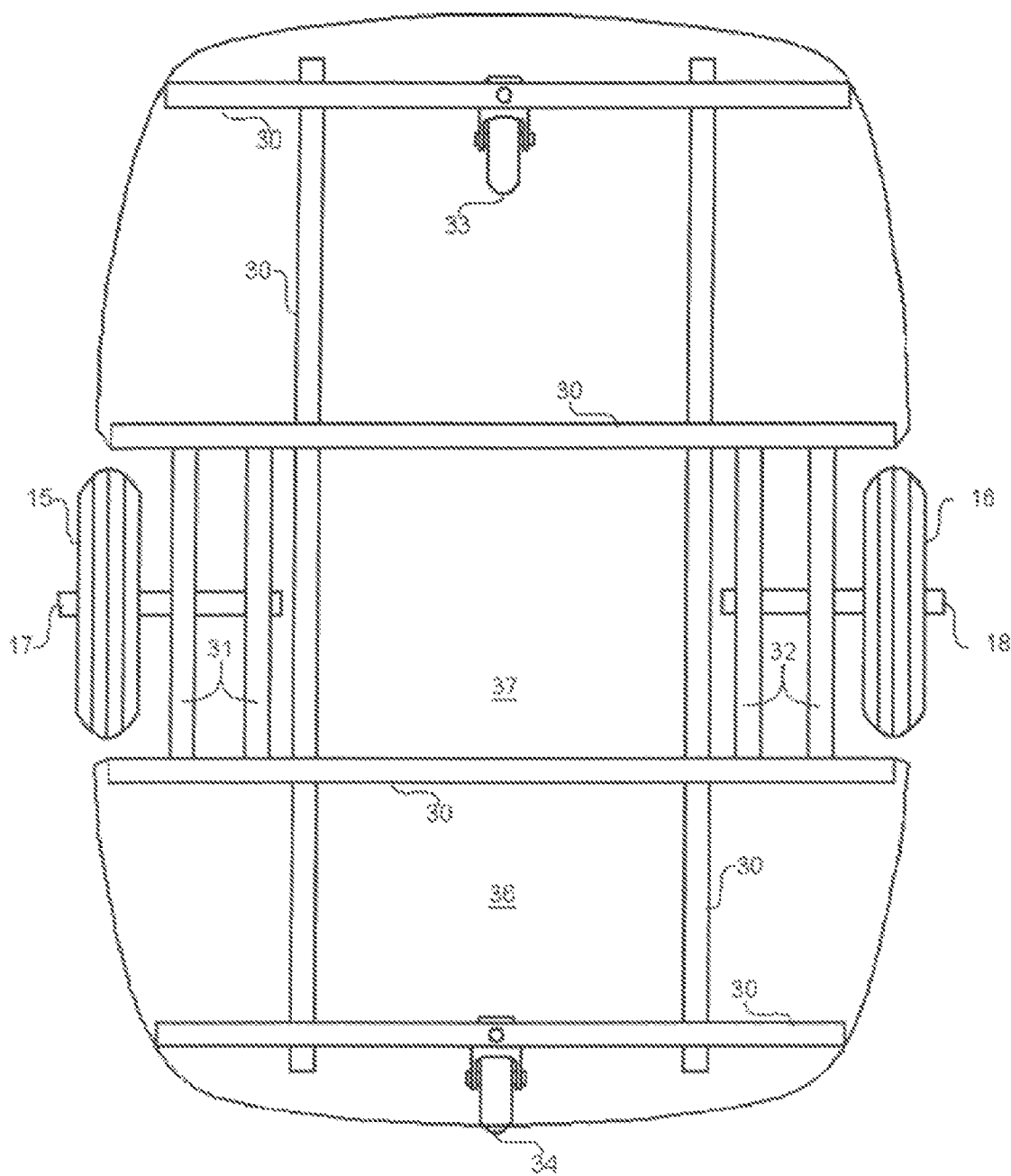
FIG. 3 is a bottom view diagram illustrating one embodiment of a wheel geometry in accordance with the present invention.

FIG. 3 shows a plan view of the vehicle chassis built an a rigid frame 30. The chassis holds the seat, 11, side panels 38, 39, front panel 19 and rear panel 29. The chassis frame also mounts the left and right drive wheel assemblies 15 and 16 respectively, each provided with a spring suspension frame 31 and 32, receptively. The spring suspension provides for rider comfort. In one embodiment, a single long axle mounts the drive wheels 15 and 16 for simpler suspension and mounting arrangement with the chassis frame.

The drive wheel assemblies are positioned one on each side the frame such that the wheels have a substantially common axis of rotation. An imaginary line joining their axle shafts 17 and 18 substantially longitudinally aligned with a vertical axis or line 19 through the center of gravity of the vehicle such that the drive wheels bear most of the weight of vehicle and payload. Longitudinally separated front wheel 33 and rear wheel 34 are each mounted near the front and rear of the vehicle, respectively. In one embodiment, these wheels are not driven but maintain contact with the ground and stabilize the vehicle. In one embodiment, the front and rear wheels 33, 34 are supported using a suspension arrangement.

In this plan view, rider's area 35 and cargo area 36 is indicated. Battery packs 50, 69 are located approximately in the region 37. In one embodiment, the battery stack '50 can be Lead-acid, Ni-Cad, Li-MH, or another chemistry. By including a fuel cell power pack the vehicle can provide a menu of choices for weight, range, recharge characteristics, and cost. In one embodiment, a separate power pack 69 is used for control circuitry, lights, and accessories. In one embodiment, the battery stacks 50, 69 use a quick-replace arrangement to enable quick replacement of a discharged battery pack with a charged battery pack in seconds. In one embodiment, a battery charger is built into the vehicle, so to charge the plug simply needs to be plugged into an AC outlet. In one embodiment, the battery charger plug is on a retractable power cord, such that it does not extend from the vehicle when not in use.

Figure 4:
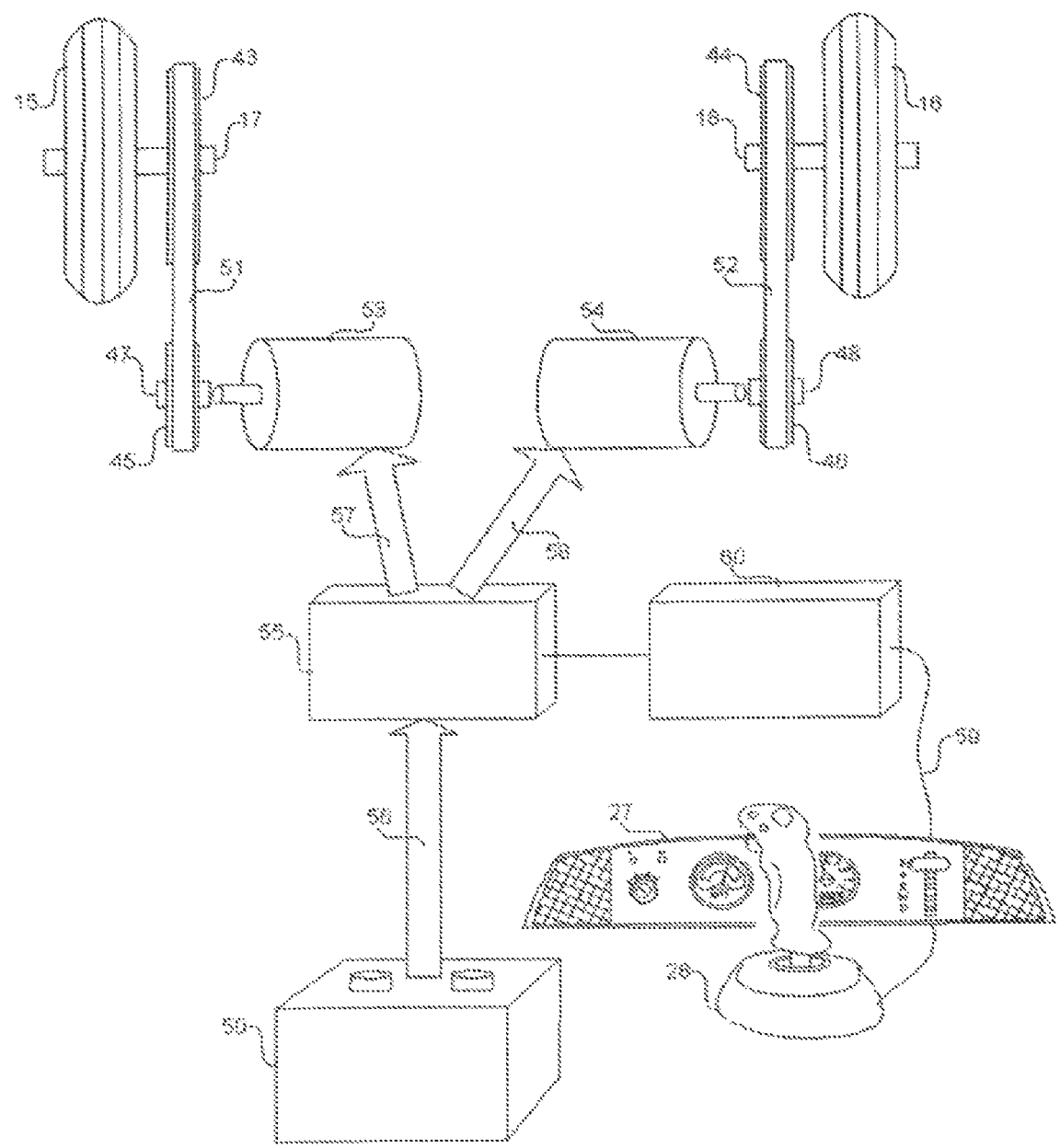
FIG. 4 is a schematic diagram illustrating a representation of the principal functional assemblies of the vehicle in accordance with the present invention.

FIG. 4 shows a schematic representation of the principal functional assemblies of the vehicle in one embodiment. To obtain the desired speed and torque, the motor operating range is geared down to the vehicle operating rage of speed. In one embodiment, left drive wheel assembly 15 is driven by a left-hand-side transmission assembly 41 consists of driven sprocket 43" (attached to axle shaft 17), a driving sprocket 45, (attached to left motor shaft 47), and a drive chain 51 linking the two. There are corresponding parts on the right side drive wheel assembly 16 and the right-hand side transmission assembly 42 is 44 (18), 46 (48), and 52. Current from battery stack 50 drives the Left Motor 53 and right motor 54, with individual power control (for left and right motor) by power control module 55. Wiring harness 57 and 58 connect left and right power control modules to their corresponding, motors. Wiring harness 56 carries battery current to motor power control module 55. In one embodiment, the metering circuits 68, 70 for the battery charge level and discharge rate are performed at this point. The motor power control module 55 is managed by vehicle control computer 60 which works in accordance with driver's commands received from joystick 28, and drive mode selector 72 in the dashboard 27, which are connected by cable 59.

The joystick 28 provides for control of the vehicle with implementation of the motive functions: forward motion, left and right turn, right and left spin, and stop. More details of the joystick are discussed in the description relating to FIG. 10. Motion control relation with respect to Joystick in a selected mode is found in FIG. 6. In one embodiment, the joystick also provides controls for audible horn or siren, indicator functions: turn signal, backup signal, and provides controls for operating the headlights. The drive mode selector 72 in one embodiment resembles drive shift lever in a car. The drive mode selector 72 is used to select between the modes: park, neutral, the reverse, weave, and drive forward.

The vehicle is maneuvered by means of applying accurately controlled power to each drive wheel, which may be driven in either direction. When the wheels are driven with equal speed in the same direction, the vehicle moves in a straight-line motion, in forward or the in reverse as selected. When the wheels are driven with a differential speed, the vehicle turns towards the slower side, at the rate dictated by the difference in power applied to the wheels. When the wheels are driven with equal speed in the opposite directions, the vehicle spins about its vertical axis. Joystick 28 provides (from the driver) input signals to drive a desired motion, which may combine forward/reverse, turn left/right, spin left/right in varying amounts. The vehicle control computer 60 computes the speed for left and right wheels 15, 16 and sends the command signal to the motor power controller 55. The motor power controller 55 ensures accurate control over the wheel speed, for the desired motion.

In one embodiment this control is accomplished by providing each drive wheel with a separately controllable electric motor and drive transmission. This transmission may comprise gears, pulley and belt systems, sprockets and chains, or any other combination that enables transfer of torque from the motor to the drive wheels. In one embodiment, the power transfer uses a fixed gear ratio. In another embodiment, a transmission may incorporate provision for varying the gear ratio between each motor and its respective wheel so as to provide optimal torque at a speed.

Figure 5:
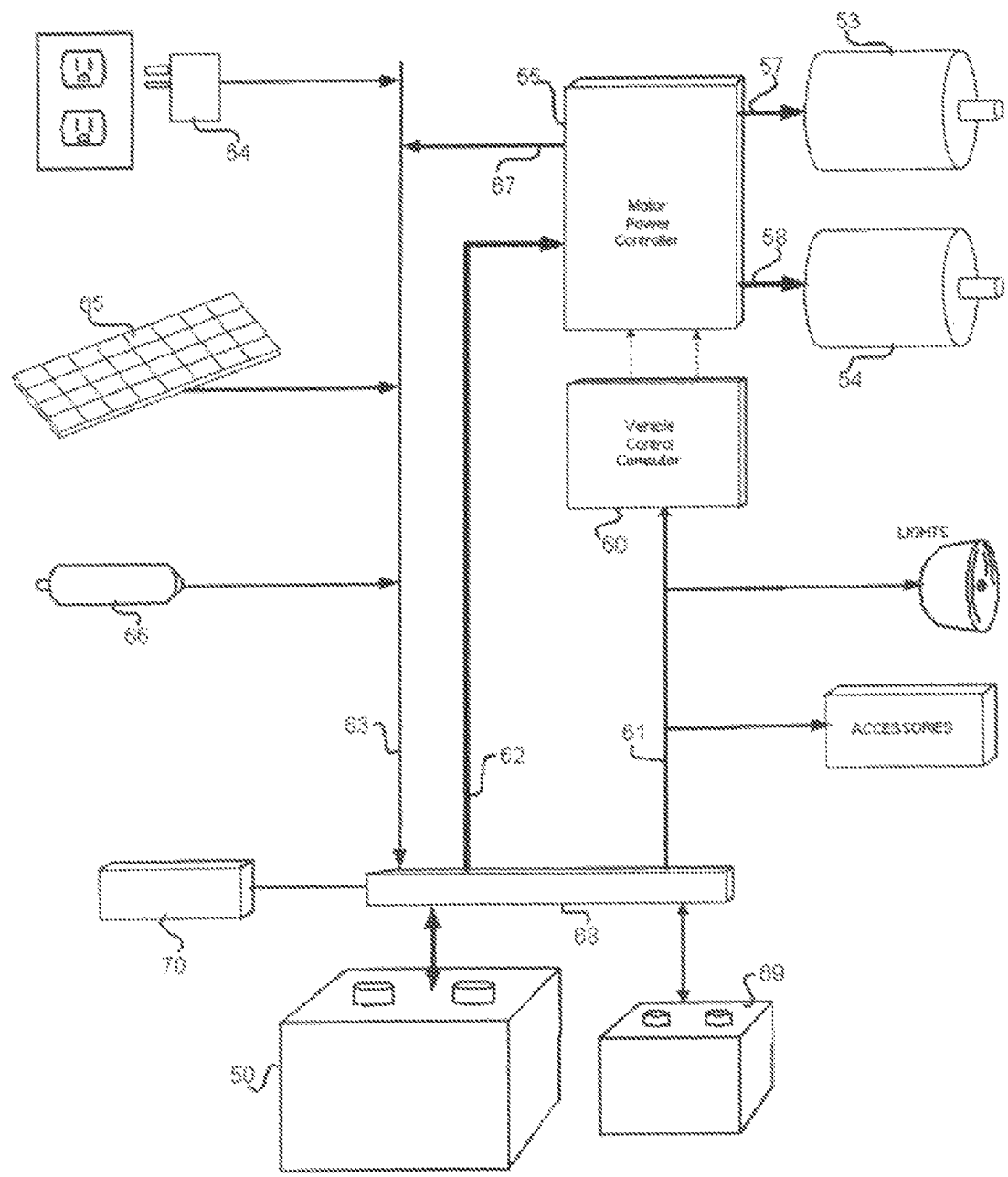
FIG. 5 is a schematic diagram of one embodiment of the electric power system with the current paths that it contains in accordance with the present invention.

FIG. 5 is a schematic diagram of one embodiment of the electric power system with the current paths that it contains. The battery 50 supplies current to left motor 53 and right motor 54 to provide the motive power for the vehicle through the motor power controller 55. The motor power controller 55 incorporates DC-to-DC power converters that may employ pulse-width modulation or another mode of power control with adjustable gain parameters for proportional, integral, derivative controls.

The current transferred through this motor power controller 55 to each motor (through path 57 to the left motor and path 58 to the right motor) is controlled by the digital vehicle control computer 60, which commands motor power according to joystick input, applying its control parameters. In addition to the main battery 50, the auxiliary battery 69 supplies power via path 61 for vehicle control computer, dashboard accessories, running lights, signal lights, audio system and other circuits.

In FIG. 5, path 62 represents the current discharge path from the main battery 50. The battery 50 is charged through the path represented by 63, which carries charging current from one or more of the available current sources. In one embodiment, the current sources include: domestic power (AC) line outlet 64, solar panel 65, or cable 66 for connection to another vehicle, for example a service vehicle. This charge path may also receive current derived from regenerative braking action from both motor, shown by path 67. Metering module 70 measures current and voltages through circuit module 68, on charge and discharge circuits. These measurements are used by the vehicle control computer to make optimized control decisions and to provide visual indication on the vehicle dashboard for operator information.

Figure 6:
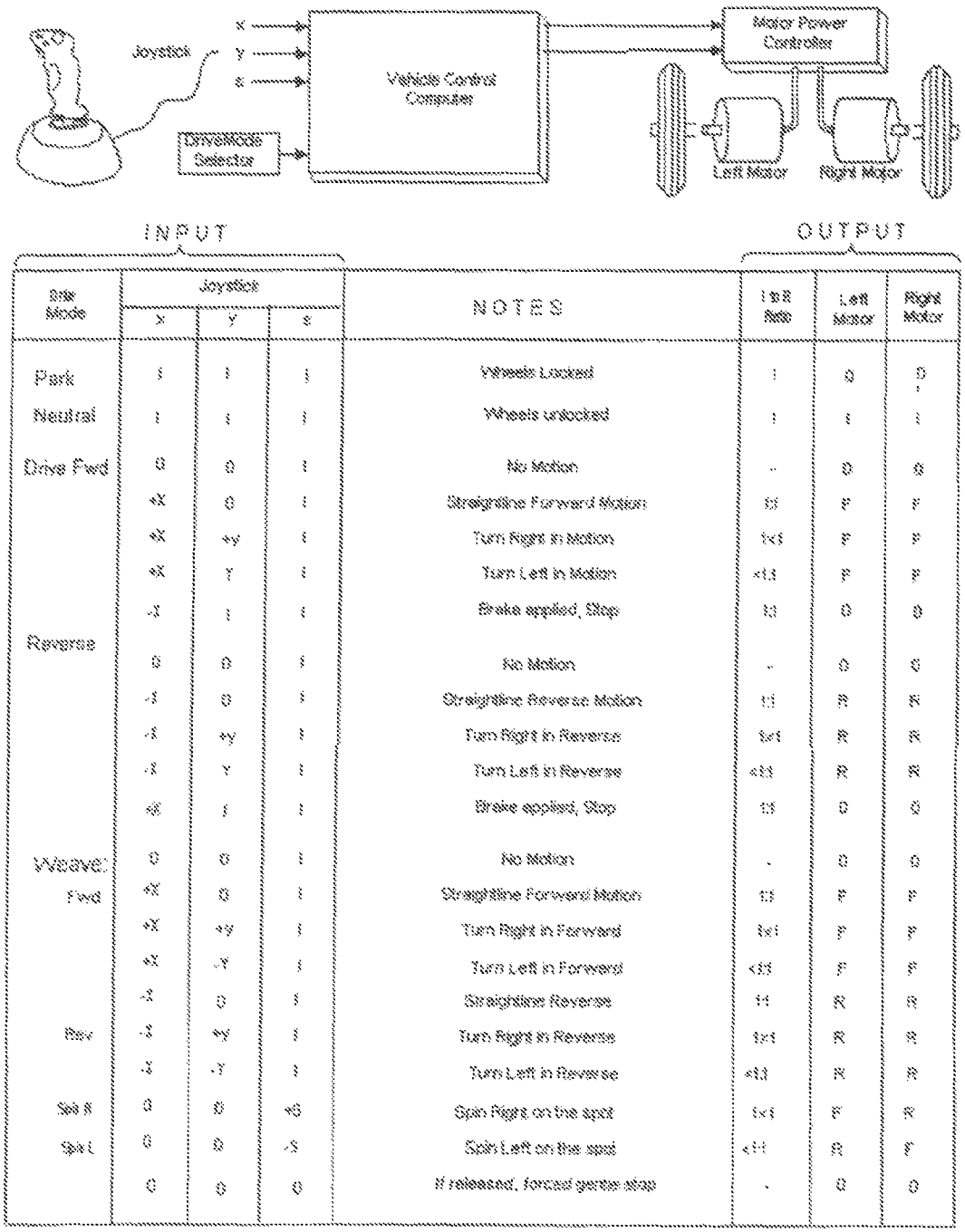
FIG. 6 is a diagram illustrating the representation of one embodiment of the joystick input in accordance with the present invention.

FIG. 6 shows the representation of one embodiment of the joystick input to the motor power output and the control relationship that is achieved in various drive modes selected. The vehicle control computer runs a software control program that establishes the input-process-output relationship in the context of real time control of the vehicle's motion control.

The selected drive mode from the dashboard 27 determines the algorithm, process, operating range, and safety limits. Joystick 28 provides x, y, s signals, corresponding to throttle, turn vector, and spin vector. The table in FIG. 6 lists exemplary x, y, s values', and the drive mode as inputs to the vehicle control computer. From the control computer 60, the output signal is sent to the motor power controller 55, which drives the motors, 53, 54 and eventually wheels 15, 16. Exemplary output sent to the left and right motors 53, 54 are also listed in the table, with left motor direction, right motor direction, and relative ratio between their speeds. For example 1:1 ratio and both motors in the forward direction represents a straight line forward motion, the actual speed depending on the throttle value.

Figure 7:
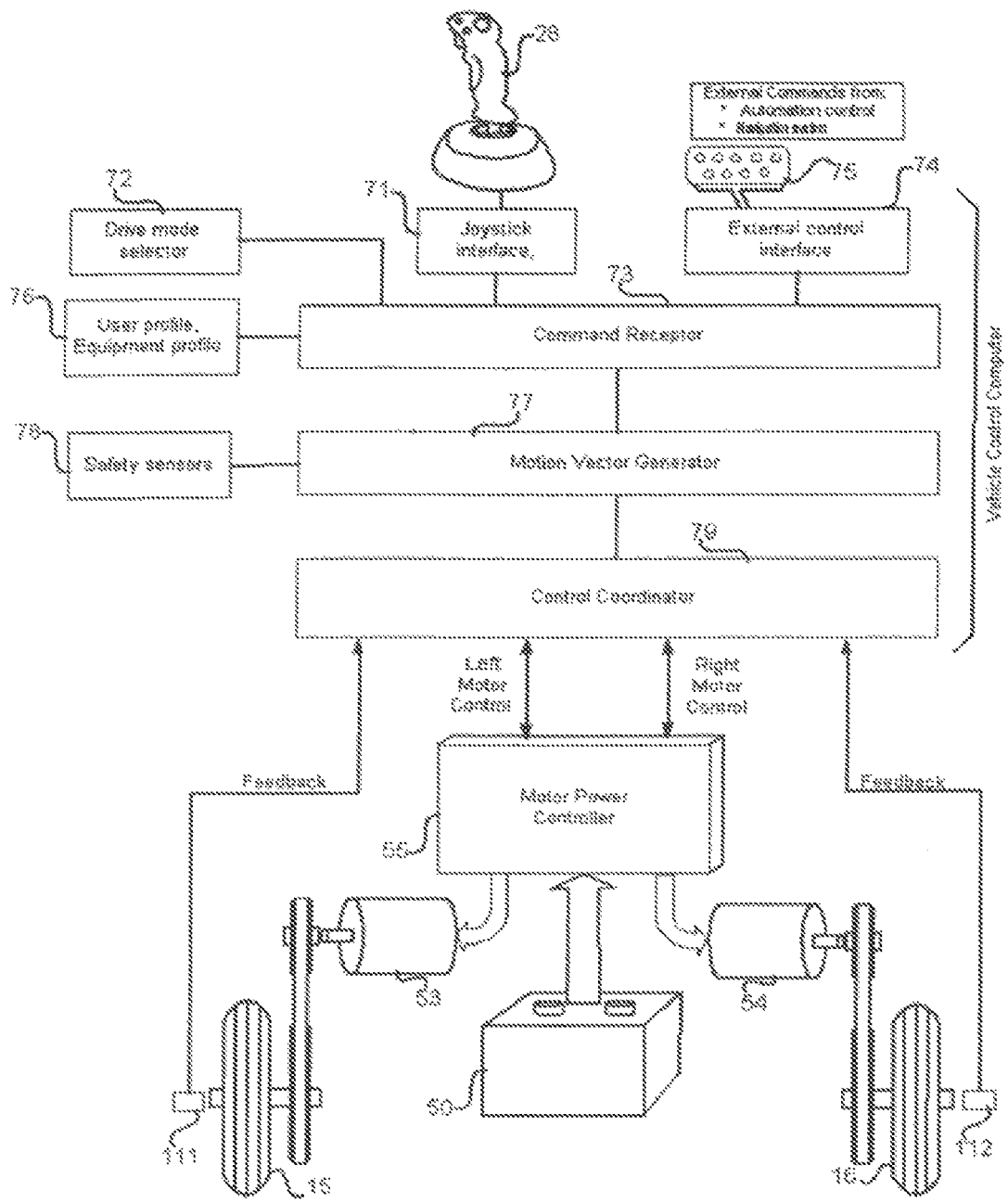
FIG. 7 is a block diagram illustrating one embodiment of the vehicle control system in accordance with the present invention.

FIG. 7 shows a block diagram of one embodiment of the vehicle control system. The vehicle control system provides the correct amount of power (and the correct polarity) to the individual wheel motors to affect the desired motion. Drive mode select switch 72 may be set in modes: park, neutral, reverse, weave, and drive forward. After a drive mode is selected, the operator pushes the joystick 28 in a desired direction, by a certain amount. The joystick input is conditioned by its interface 71. Command receptor 73 receives signal inputs from the drive mode selector 72 and joystick interface 71 or from an external signaling interface 74. The external signaling interface 74 interacts with its connector 75 enable external systems to provide navigation guidance. For example, the external systems may include a GPS-receiver based controller, a towing controller, a remote controller, or other forms of controls.

These inputs are received as a continuous stream of control data. The control data is essentially the motion directives. In one embodiment, the motion directives are influenced and modified by the particular user profile and equipment profile represented by module 76, and the modified control data is passed to the motion vector generator 77. The user profile and equipment profile module takes account of settings such as type of user permissions and equipment capabilities to determine and influence or override driving characteristics, optimizing battery energy, towing permissions, and several other features. For example, a child may have an activation key that indicates that he or she is limited to driving at 5 miles per hour. Thus, regardless of how hard the joystick is pushed forward, the user profile limits the maximum speed of the vehicle. Other motion characteristics, such as maximum acceleration, maximum range, etc. may also be limited.

The motion vector generator 77 processes the command signals received in real time from the command receptor module 73, taking account of input from safety sensors represented by module 78. Such sensor inputs, in one embodiment, include, among others, anti-roll and motor temperature sensors. Collision sensors can be used for "smart" collision avoidance by sensing position and dynamic target vector so as to be able to compute collision likely profiles and prevent or minimize their effect. The motion vector generator module 77 generates a real-time motion vector that is referred to the center of the vehicle. This motion vector is continually output as drive command signal, which is translated by the control coordinator 79 into separate drive signals (intended for the left and right motors 53, 54) to the motor power controller 55. These drive signals cause the motors to be powered in a coordinated fashion and in such proportion to realize the motion vector.

In one embodiment, the control, coordinator module 79 also receives returned angular velocity, or position' encoder 111, 112 feedback from the wheels. This feedback mechanism is used to enhance the precision of control and provide functions such as anti-lock braking. It may be also used in a determination of lost wheel traction and in case of variable transmissions provide the feedback for optimizing gear ratio dynamically. In FIG. 7, the modules represented 71, 73, 74, 77, 79 are logical modules that are part of the vehicle control computer 50.

The manner of using the vehicle is very similar to driving a car, except that the driver uses a joystick, instead of using a steering wheel, throttle, and brake.

In one embodiment, to drive the vehicle, operator chooses appropriate drive mode selection on drive mode selector 72 and works on the joystick 28 positioned in front of the operator. The drive mode selector 72 is used to select between the modes: park, neutral, reverse, weave, and drive forward. Park uses a mechanical wheel brake to ensure that the vehicle does not move. Neutral disengages the motor from the wheels and releases the parking brakes. Drive forward is used the most, to drive in the forward direction, with turns when needed. Reverse operates in a similar fashion in reverse direction, with a reduced speed for safety. Weave is a combinational mode useful in restricted indoor spaces for forward, reverse, spin motions simultaneously but for a very restricted speed of operation. Weave mode, the joystick controls are altered to provide forward and reverse movement, without changing the drive mode.

The joystick 28 provides for control of the vehicle with implementation of the motive functions: straight-ahead motion, left and right turn, reverse motion, right and left spin on the spot, some combination motions, and brake operation. In one embodiment, a mechanical brake is provided for emergency stop and parking operation. In one embodiment, an engine brake may further be provided.

In one embodiment, the joystick also provides controls for turn indicator, backup signal, headlights, and horn. In one embodiment, the onboard multimedia computer may be employed for a variety of amusing effects, sounds for horn function and selectable engine noise like jet engine, steam engine, racing car, motor bikes, etc. that track the throttle.

Figure 8:
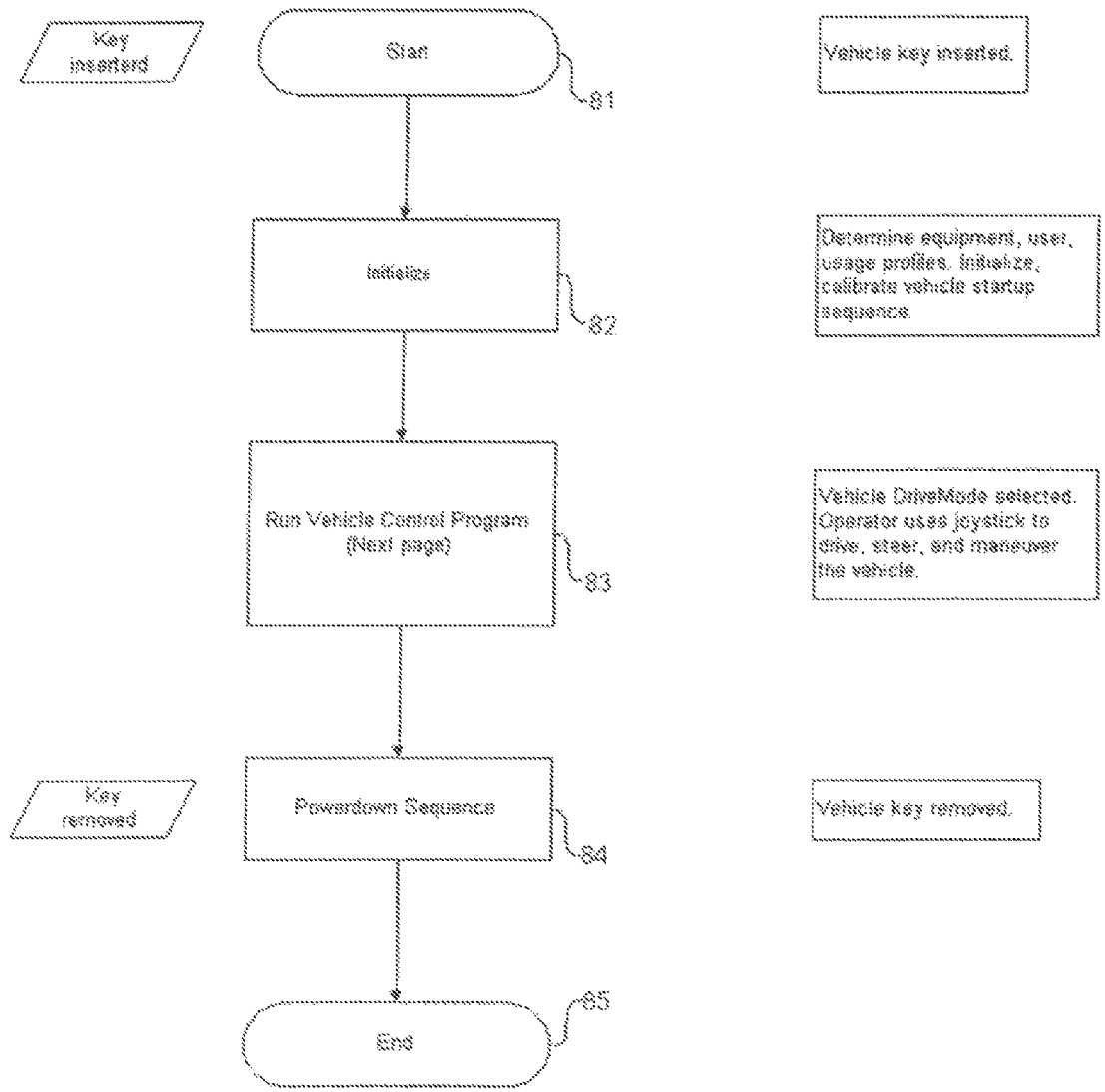
FIG. 8 is a flow chart diagram outlining one embodiment of the operational sequence that an operator would encounter in accordance with the present invention.

FIG. 8 outlines one embodiment of the operational sequence that an operator would encounter. The driver after he or she is seated inserts the authentication card or key. Dashboard lights up showing appropriate meter readings and indications. The driver shifts the drive mode selector from "park" to "drive forward" position. The driver now gently engages the joystick to move forward. The vehicle starts moving, accelerating, until the desired speed (directed by joystick) is reached, and continues to track the joystick input in real time. In one embodiment, the acceleration is limited by the user's profile. Thus, even if the user roughly pushes the joystick forward, the acceleration will be at a safe pace.

A slight move to left or right on the joystick makes the vehicle to turn in the desired direction, by the desired amount. When the destination is reached, the driver slows down, pulls back the joystick (to brake the vehicle), releases, the joystick, (which returns to a neutral position), shifts the drive mode selector to "Park", removes the key, and leaves the vehicle. Other drive modes like wise work in conjunction with the joystick, which are essentially variations in similar controls.

The sequence start 81 begins when the key is inserted. An initialize sequence 82 obtains a set of values, determined based on the user profile information on the card and from the equipment profile information on the vehicle control computer. Following initialization 82, control is passed to the vehicle control program 83, which is detailed in the flowchart of FIG. 9. This program controls the vehicle in response to operator input until the key is removed, at which time a power down sequence 84 is entered. On completion, the program sequence ends 85.

Figure 9:
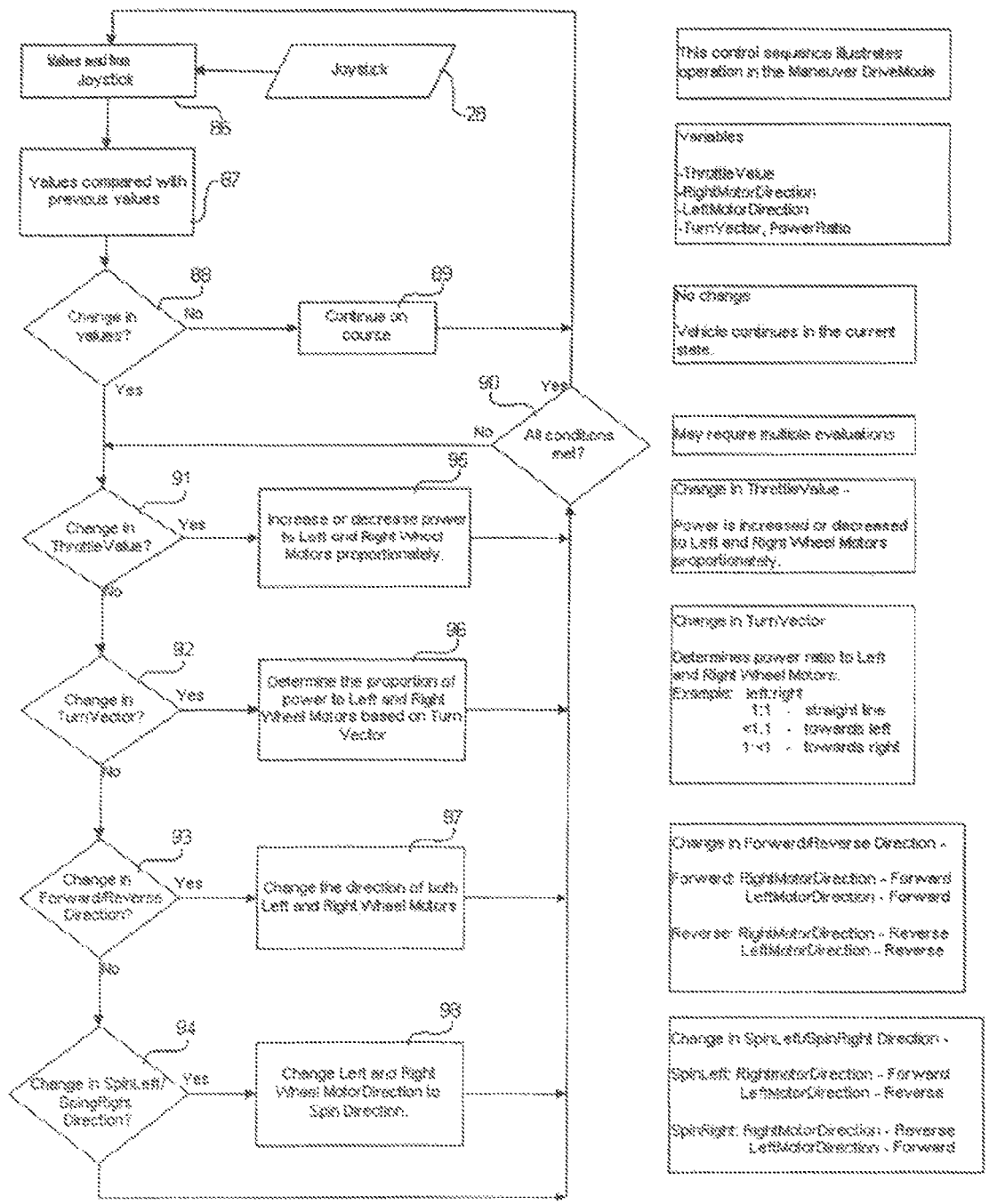
FIG. 9 is a diagram illustrating an e operational control sequence with drivers input from joystick in accordance with the present invention.

FIG. 9 shows the detailed vehicle operational control sequence with drivers input from joystick. The "weave mode" is chosen here for discussion here, since it has full freedom of motion, and program execution sequence transmits through all modules. Joystick 28 provides the current reading of x, y, s parameters, to the logic module 86. The signed numeric values of these parameters correspond to throttle value, turn vector and spin vector.

When the vehicle is driven at a constant speed, and there is no change in any of the parameters 88, the vehicle continues on its current course 89.

A logic module 87 compares the current values of x, y, and s with the previous values to detect a difference in throttle value 91, turn vector 92, forward/reverse direction 93, spin left/right direction 94. Suitable action is performed in modules 95, 96, 97, 98 corresponding to decisions made at 91, 92, 93, and 94. Module 90 makes sure all, conditions are met to complete the change of course observed from the joystick. Due the vehicle dynamics, it may take a short while to complete the action, for example to execute a turn it takes a second or two, during which time the control loop is steered by logic module 90 through the current action, until complete. The control loop continues to keep the code execution stay on current course 89. If the hand is released from the joystick, it returns to a neutral position, resulting in a zero motion.

Figure 10:
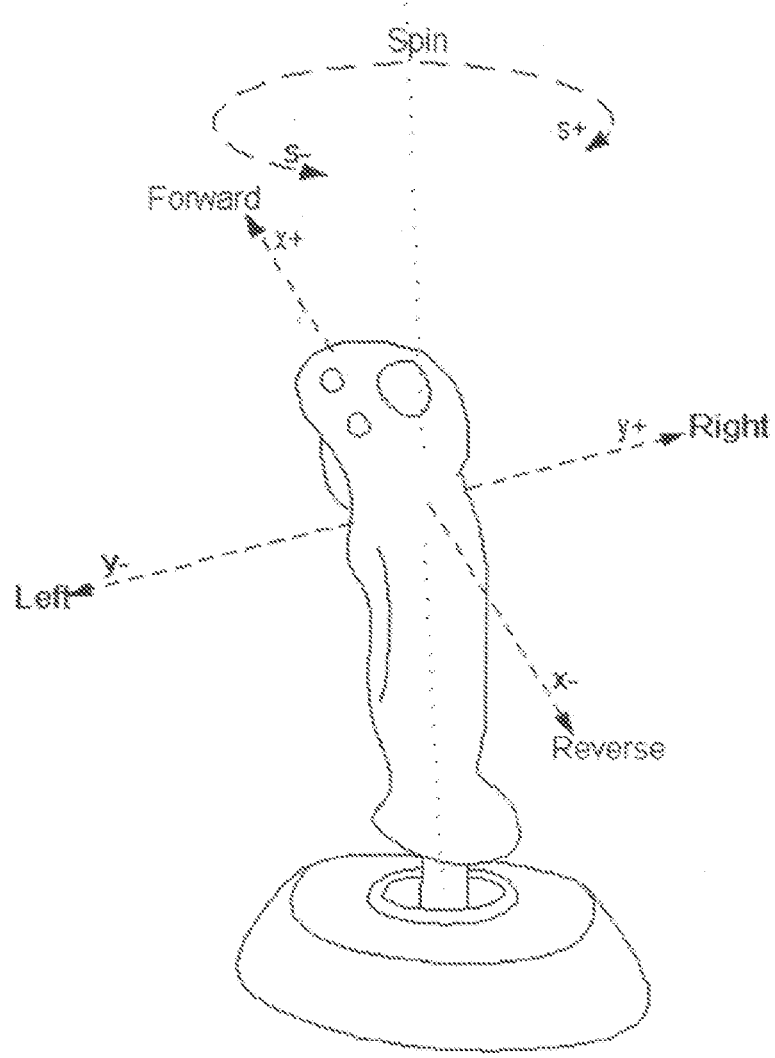
FIG. 10 is a diagram illustrating a representation of the joystick control in accordance with the present invention.

FIG. 10 shows a representation of the joystick control. In one embodiment, the joystick is mounted on a mechanical arrangement that adjusts for comfortable operator manipulation while positioned on any part of the seat. For example, the operator could be seated on the left or right side and operator and passenger roles might be switched easily without either one having to change seats. In one embodiment, the joystick is spring loaded with a neutral center position at which the vehicle is brought to a complete stop. The joystick returns to this neutral center position when the operator's hand is removed.

In one embodiment, the Joystick handle can be moved over a complete 360 degrees. Forward joystick movement activates forward motion; reverse motion is activated by reverse movement of the joystick in weave mode, while forward joystick movement actives forward motion, and reverse joystick movement brakes the car in forward mode. These movements are augmented with slight turns, if the joystick handle is moved sideways. The joystick can also be twisted clockwise or anticlockwise by about 90 degrees. This movement is used to accelerate a turn, or it is used to initiate a spin about the vehicle's vertical axis. In one embodiment, if the joystick has a vibrating motor in it, can provide the operator with tactile cues from the equipment to alert of an impending situation, for example, the driver operates beyond safe range, This simple feedback reminder adds to the safety of operating the vehicle. The joystick has a trigger button that can be operated by the forefinger, to activate the vehicle horn. In one embodiment, a multimedia-enabled talking horn can be activated. In one embodiment, there is also a hat switch, which is used to activate the turn signals, headlights, and rear lights. Other programmable switches on the handle and on the base of the joystick may be used for a variety of functions. In another embodiment, these switches or controls may be located on the dashboard, and not be a part of the joystick.

In another embodiment, speech input is processed and used as the primary control of the vehicle. In this case, the input from the joystick is substituted with external control interface 74, 75, (FIG. 7) sending control codes that are interpreted from the voice commands. This implementation may be made to use speaker independent form of speech recognition or a speaker dependant form. In the speaker dependent form, speech processing is selected only to react to the voice of a particular person, recognized by the personalized smart card. This embodiment may benefit handicapped people or provide yet another comfortable interface to interactive fun seekers.

Figure 11:
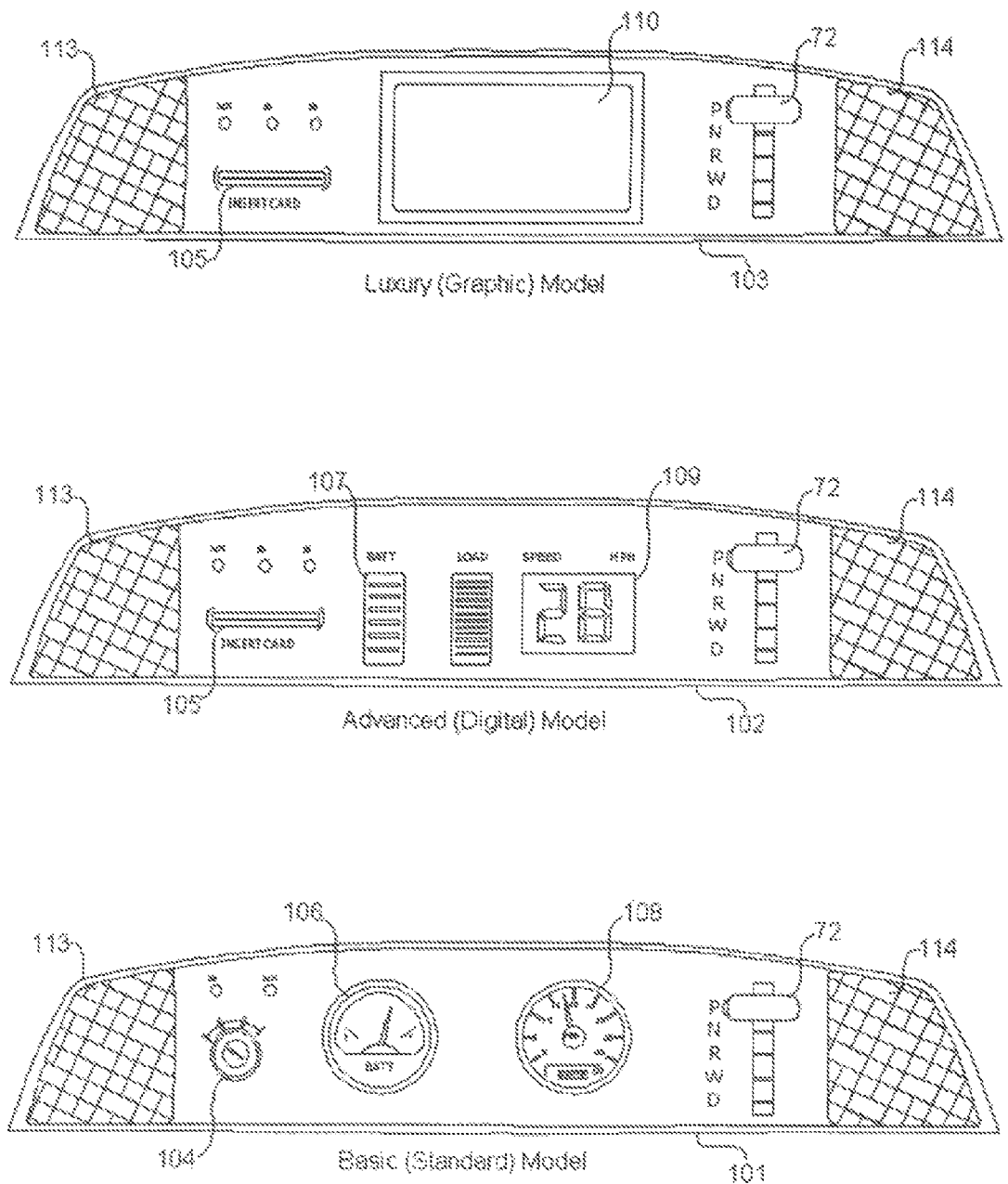
FIG. 11 is a diagram illustrating embodiments of dashboard design in accordance with the present invention.

FIG. 11 shows three embodiments of dashboard design 27, a basic design 101 with analog meters, an advanced design 102 with digital displays, and a luxury design 103 that has a graphic display unit and employs a multi-media computer. Essential functional features are the same across these embodiments but their implementation may differ. The principal elements on the dashboard are the authorizing key, instrumentation display, drive mode selector, accessories, and entertainment consoles.

The authorizing key 104, 105 ensures the driver has rightful ownership of the vehicle. In the basic design, in one embodiment, the authorizing key 104 resembles a standard vehicle ignition key and it has four positions: off, accessories power, vehicle motive systems enabled, and finally, external motion control. In the advanced and luxury models, the authentication key takes the form of a smart card, which can be inserted into the smart card reader 105. The smart card carries the user's authority and can enable a greater range of functions to be programmed. One of the, key benefits of the smart card is that it enables usage based billing directly based on smart card. The user uses this feature in a way similar to calling cards, where the money is paid at first, for a predefined amount of usage.

Indicator lamps are provided to indicate vehicle status (color-coded) of electrical system and energy system. Analog meter 106 displays battery charge level, by digital bar graph indicator 107, and in the LCD panel display 110, for the basic, advanced, and luxury models, respectively. Indicators 108 and 109 display speed.

In the luxury model, the graphics panel display 110, in one embodiment a touch screen using liquid crystal display (LCD) is attached to a multimedia enabled dashboard computer, which generates graphical images in color. These are multi purpose displays with touch screen that provide interactive responses. One such choices display the vehicle status. In other choices of display, several capabilities for multimedia entertainment, voice and text based instant communications and other interesting options are provided. Left and right speakers 113 and 114 are provided, for audio prompts (talking vehicle), and multimedia entertainment.

The drive mode selector 72, explained earlier is found in the three embodiments of the dashboard described here. It selects between the drive modes: park; neutral, reverse, weave, and drive forward.

Figure 12:
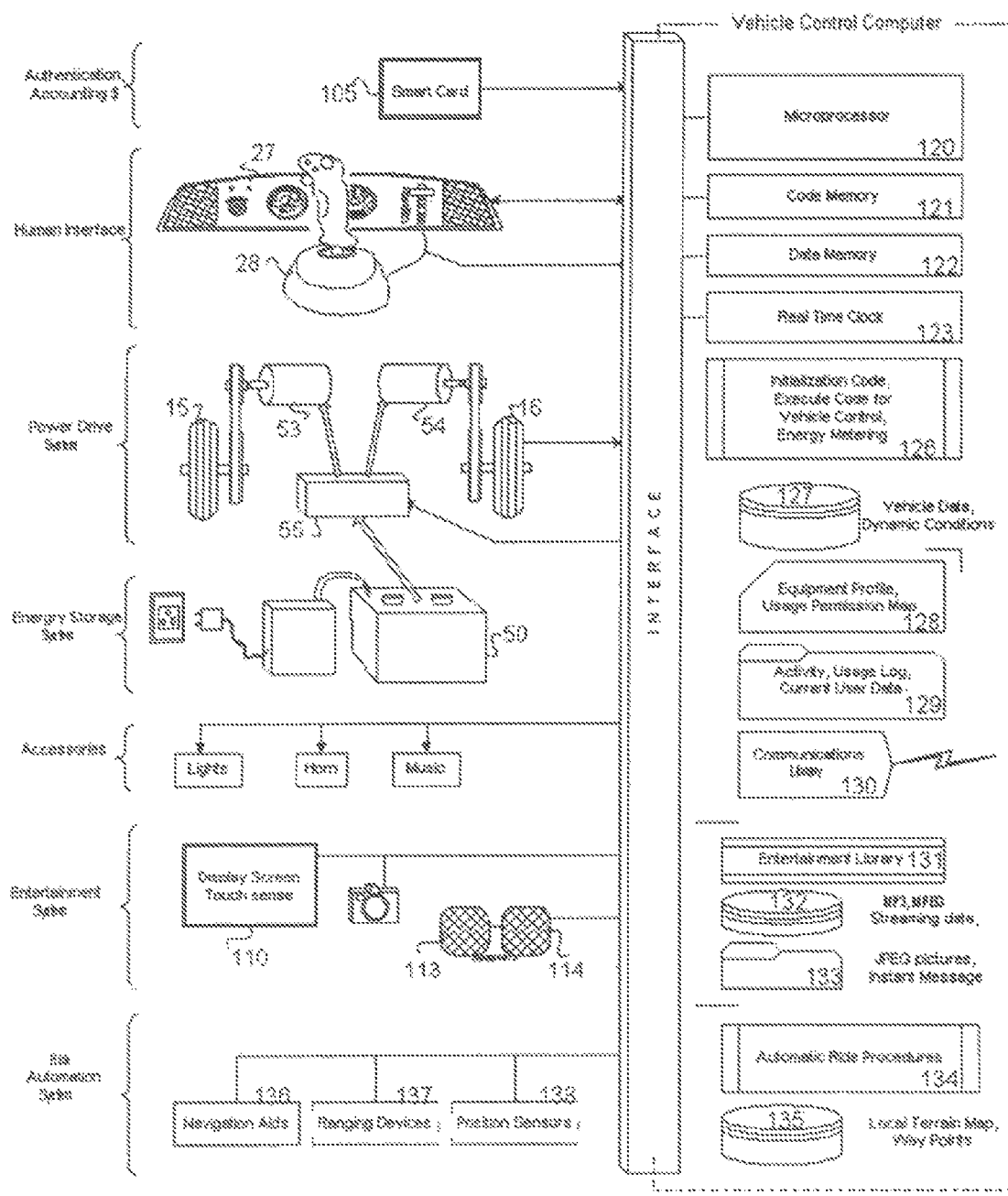
FIG. 12 is a diagram illustrating one embodiment of the components of the vehicle control computer and its interfaces to the various parts of the vehicle in accordance with the present invention.

FIG. 12 describes one embodiment of the components of the vehicle control computer and its interfaces to the various parts of the vehicle. The microprocessor 120, code memory 121, data memory 122, the real time clock 124 and the interfaces 125 are the physical components of the vehicle control computer. The microprocessor 120 executes the read-only codes from the code memory 121, in a sequential manner. During the program code execution, the data memory 122 is used to store results of the computation and referred later when necessary. The real time clock 124 maintains an accurate timing mechanism and keeps the real time code execution in sync.

There are several types of physical interfaces 125 represented that connect the devices to the vehicle control computer. Interfaces to dashboard electronics, motor power controller, battery charging circuits, accessories like lights, horn are some of the interfaces that are used.

The software organization of code segments and data segments establish a logical relationship for a functional aspect involved in vehicle control computer. These are grouped under the respective symbol representing its function. Procedural logic module 126 is the procedural section, which is executed, in one embodiment, after the initialize sequence. In one embodiment, permissions logic module 128 represents a card file that has the equipment profile and usage permission map.

The communications library 130 may also be available to the vehicle. In one embodiment, the communications library 130 includes wireless protocol that is used in the deployment of wirelessly connected vehicles. In one embodiment, the motion control interface uses text-based messages that resemble XML-like simple syntax, with advanced vocabulary. The set of predefined message strings makes it easy to integrate in larger scheme of automation and intelligence. The communication interface is extended to a wider coverage using RF modems, and notably wireless Wi-Fi networking.

The entertainment logic module 131 contains entertainment libraries that include locally stored collection and a huge amount of data accessible over the wireless LAN. Contents like MP3 music clips and MPEG streaming video are supported. Personalized files may provide room for additional JPEG photo picture clips, instant message sessions. The vehicle can have special programmed sequence movement for fun ride.

In one embodiment, the vehicle incorporates an ability to execute macros or subroutines. The vehicle control computer can be used for (memorizing and instructing) performing certain routine maneuvers when the sequence is desired. In one embodiment of the vehicle, some relevant macros may be incorporated. For example: high speed spin times for a dizzy effect on the rider, rock (shake) and roll, while the vehicle moves on a course, loose wobbly motion like a drunken walk while the vehicle stays on course, pirouette walk, slow 360 spin while, maintaining straight course.

In one embodiment, the vehicle provides built-in mechanisms for creating automated rides. Automation logic module 134 handles such procedures related to automatic rides. Such an automated ride would use information on local terrain maps and waypoint details provided in location recognition logic module 135. In order to effectively execute the automated ride, additional equipments to provide navigation aids 136, ranging devices 137 and position sensors 138 may be used. These details vary with specific technology to be deployed and the complementary sensor system to provide safe, and fun filled rides.

Figure 13:
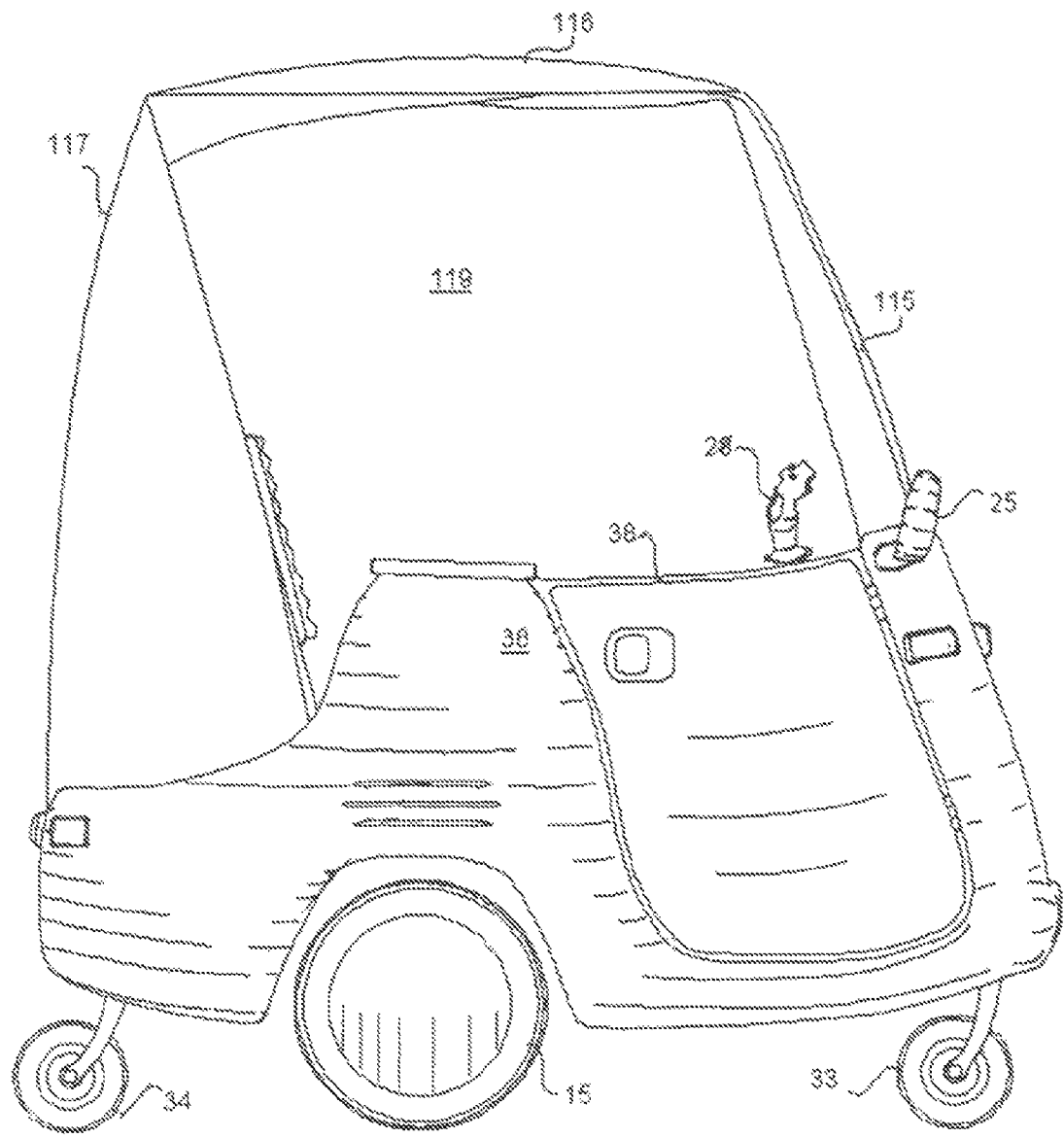
FIG. 13 is a diagram illustrating one embodiment of a hooded design for the vehicle in accordance with the present invention.

FIG. 13 describes another embodiment, to include a hooded design for the vehicle. This vehicle is described in the generic design disclosure as having an open form, with seats, drive control and dash board. A design that incorporates a body to cover the sides and the top is useful in certain applications, for example, those where the windshield and the roof provide the user protection from cold, windy, wet weather conditions as well as intense sunlight. The design incorporates a solid windshield 115, soft roof 116, and rear windshield 117, with necessary support structures. This design can optionally be provided with door 118 and window 119. On the roof, adequate surface area is available for incorporating a suitable solar charger.

Figure 14:
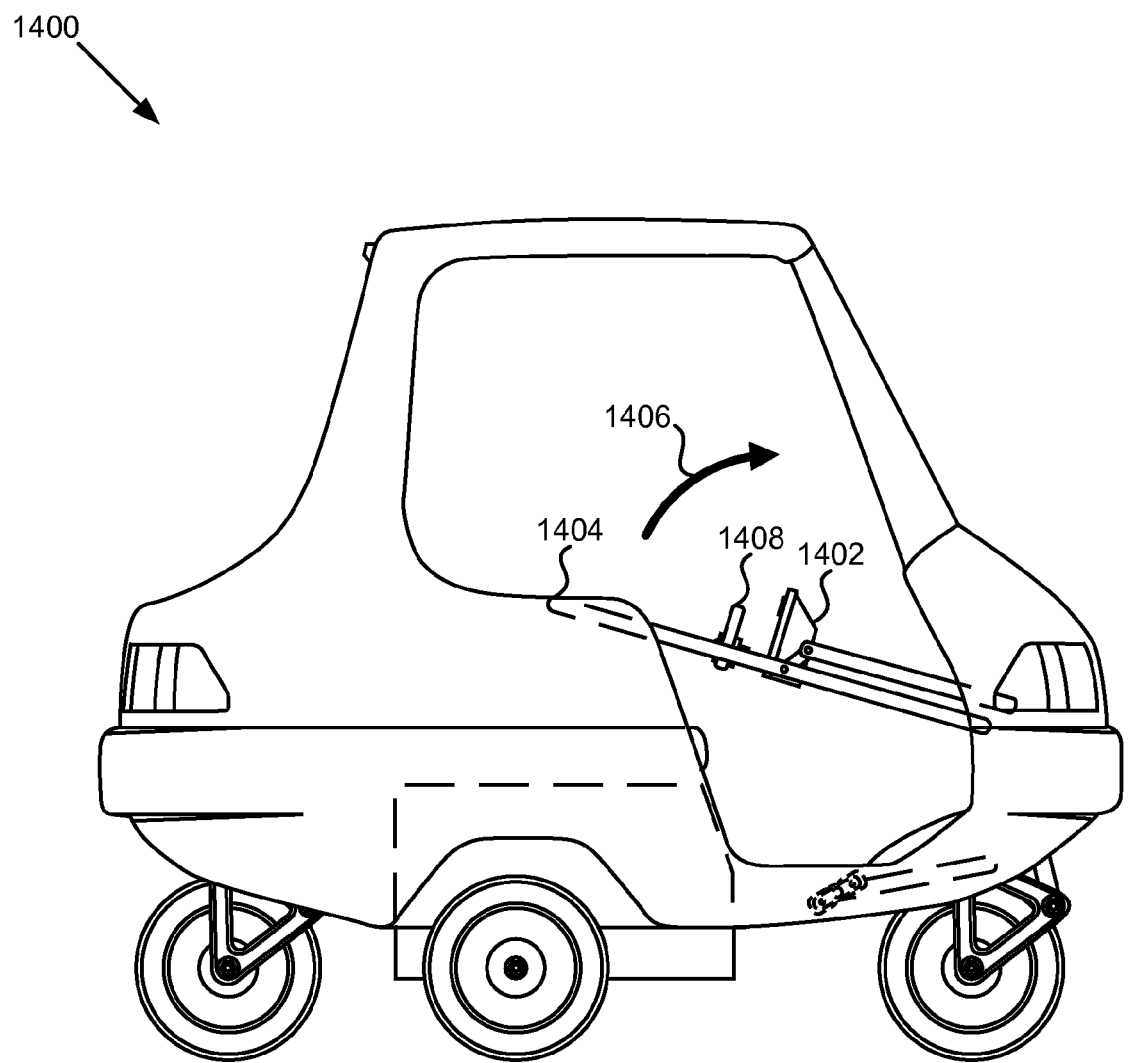
FIG. 14 is a schematic block diagram illustrating an alternative embodiment of the vehicle in accordance with the present invention.

FIG. 14 is a schematic block diagram illustrating an alternative embodiment of the vehicle 1400 in accordance with the present invention. As described above, the vehicle 1400 comprises a plurality of wheels arranged in a substantially diamond-shaped pattern, in order to provide superior maneuverability. The vehicle 1400, in one embodiment, further comprises a drive console 1402 mounted on a lapbar 1404. The lapbar 1404 is pivotally connected with the frame (not shown) of the vehicle 1400 in such a manner that the lapbar 1404 may be lifted up and away from a secured position as indicated by arrow 1406.

The lapbar 1404 is further configured to help secure a rider inside the vehicle 1400 in a manner similar to that of a roller coaster lapbar. In a further embodiment, a steering wheel 1408 may be mounted to a rider-facing surface of the drive console 1402 to facilitate operation of the vehicle 100. The vehicle control computer 60 may be configured to interface with the steering wheel 1408 in a manner similar to the manner in which the vehicle control computer 60 interfaces with the joystick 28 as described above with reference to FIG. 4. For example, the vehicle control computer 60 is configured to interpret the position of the steering wheel 1408 and compute an appropriate speed for right and left wheels 15, 16. The vehicle control computer 60 subsequently sends commands to the motor power controller 55 as described above.

In a further embodiment, the speed of the vehicle may also be adjusted using the steering wheel 1408. The steering wheel

1408 may be configured to move into and out of the drive console 1402 according to a force supplied by the operator of the vehicle 1400. For example, if the operator desires to increase the speed of the vehicle 1400, the operator may pull on the steering wheel 1408. The natural resting position of the steering wheel 1408 may indicate a neutral state, and correspondingly, pushing on the steering wheel 1408 would indicate a desire by the operator to either slow down or move in a reversed direction.

Figure 15:
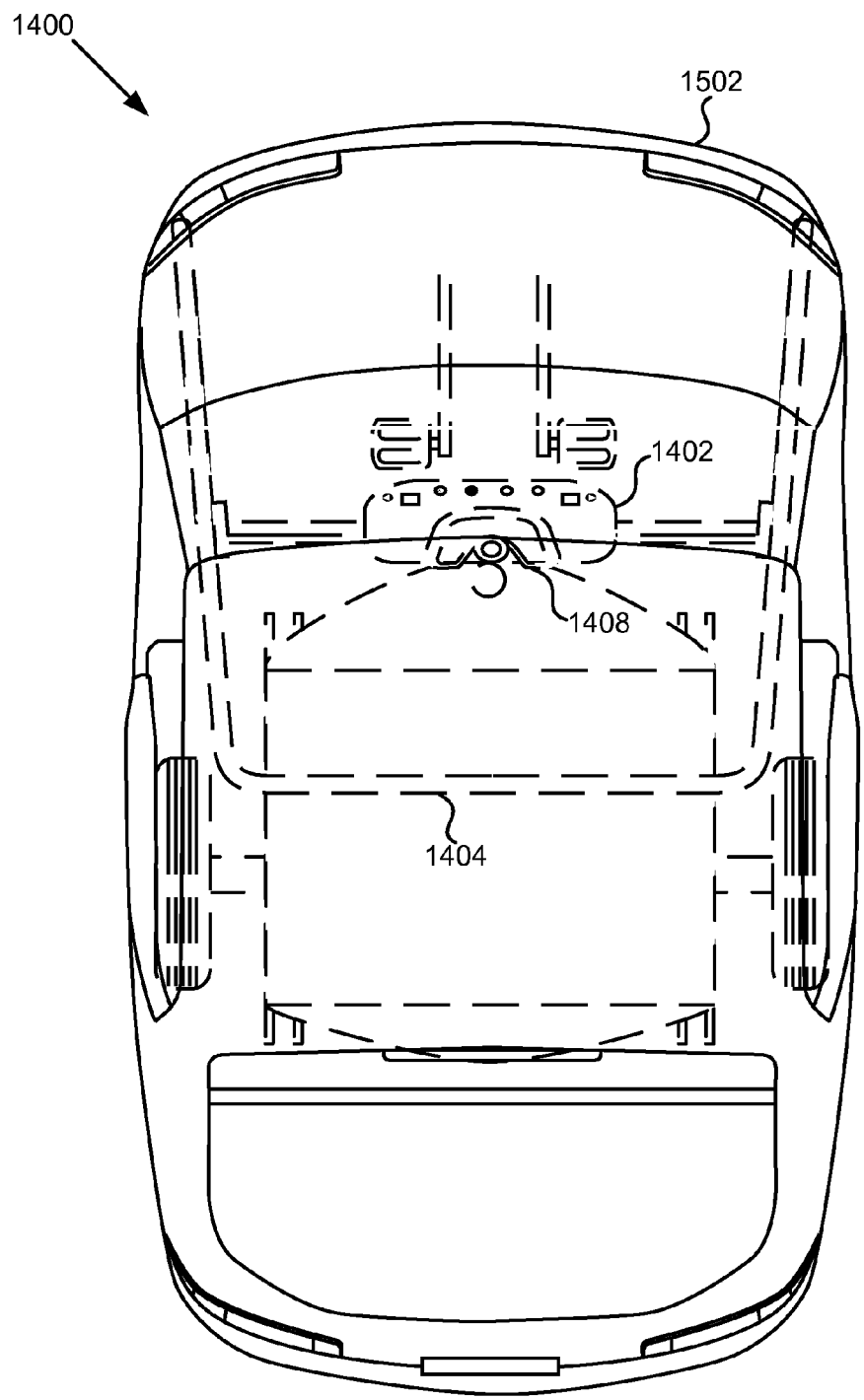
FIG. 15 is a schematic block diagram illustrating a top view of the vehicle in accordance with the present invention.

FIG. 15 is a schematic block diagram illustrating a top view of the vehicle 1400 in accordance with the present invention. In one embodiment, the lapbar 1404 connects to the frame of the vehicle 1400 near the front 1502 of the vehicle. The lapbar 1404 extends from the front of the vehicle 1400 to a selectable position chosen by the operator to comfortably restrain the operator. The lapbar 1404 may be adjusted in order to compensate for large adults as well as small children. As depicted, the drive console 1402 comprises a gracing-style steering wheel 1408 in order to accommodate the legs of the operator without occupying a large amount of space. However, a normal, full circle steering wheel 1408 may be used.

Figure 16:
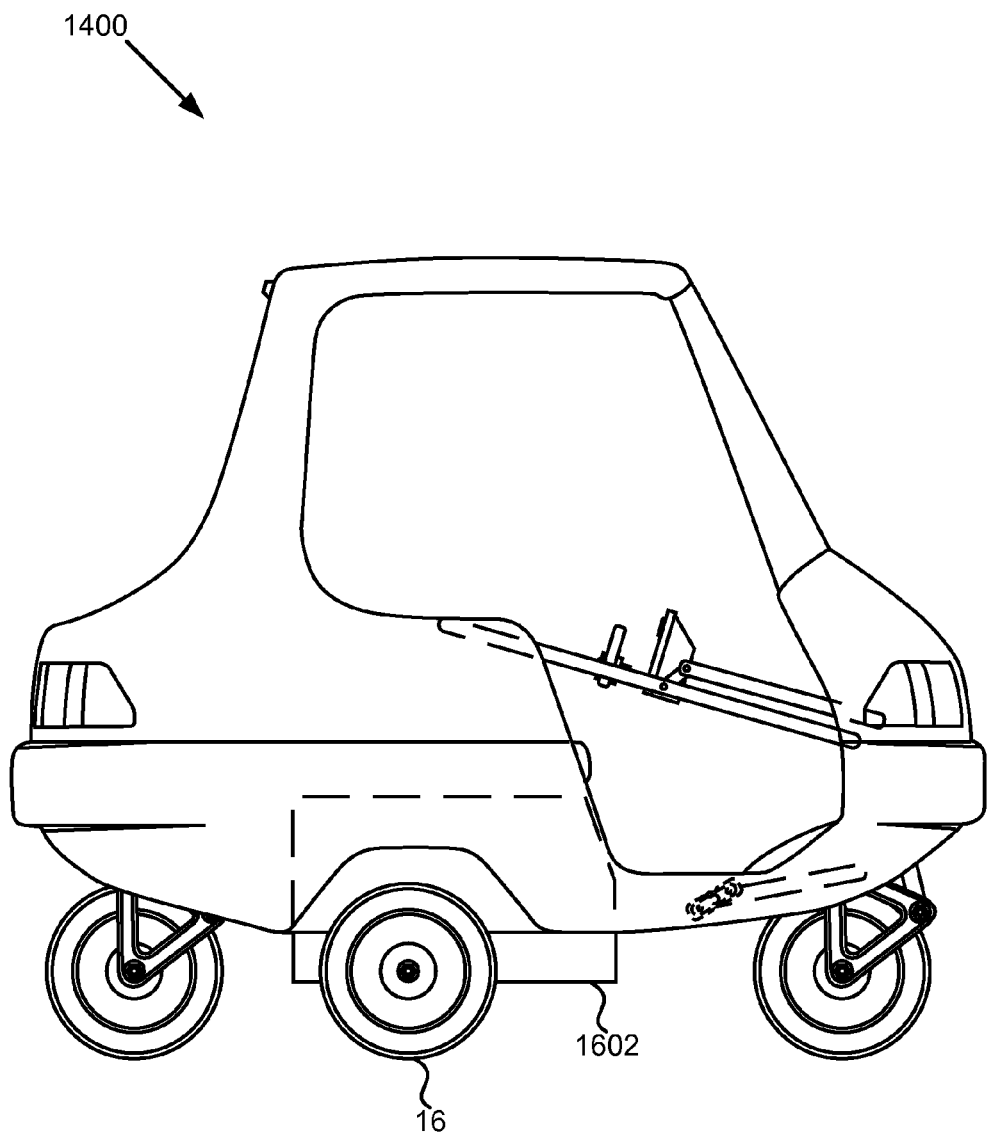
FIG. 16 is a schematic block diagram illustrating one embodiment of the vehicle having a removable power pack in accordance with the present invention.

FIG. 16 is a schematic block diagram illustrating one embodiment of the vehicle 1400 having a removable power pack 1602. In one embodiment, the power pack 1602 is hingedly coupled with the underside of the vehicle 1400. The power pack 1602 includes a power source that may be electric powered, gas powered, hybrid-electric powered, fuel cell powered, or the like. The removable power pack 1602 provides several benefits including the ability to have a choice of energy, choice of power energy controllers, choice of motors, choice of transmission and differential, and choice of wheels. In one embodiment the wheels 16, 17 are coupled to the power pack 1602. Furthermore, a secondary power pack 1602 may be towed behind the vehicle 1400 to assist in climbing by providing extra power, and fitted with an optional luggage platform.

In a further embodiment, an additional power pack 1602 may be towed in order to replace the power pack of a second vehicle 1400. For example, the power pack 1602 may be towed to a second vehicle 1400 whose battery has died. Once the replacement power pack 1602 has been installed, the dead power pack 1602 may be towed to a service station for power regeneration. In one embodiment, the power pack 1602, if powered by electric batteries, may be regeneratively recharged as the power pack 1602 is towed.

Figure 17A:
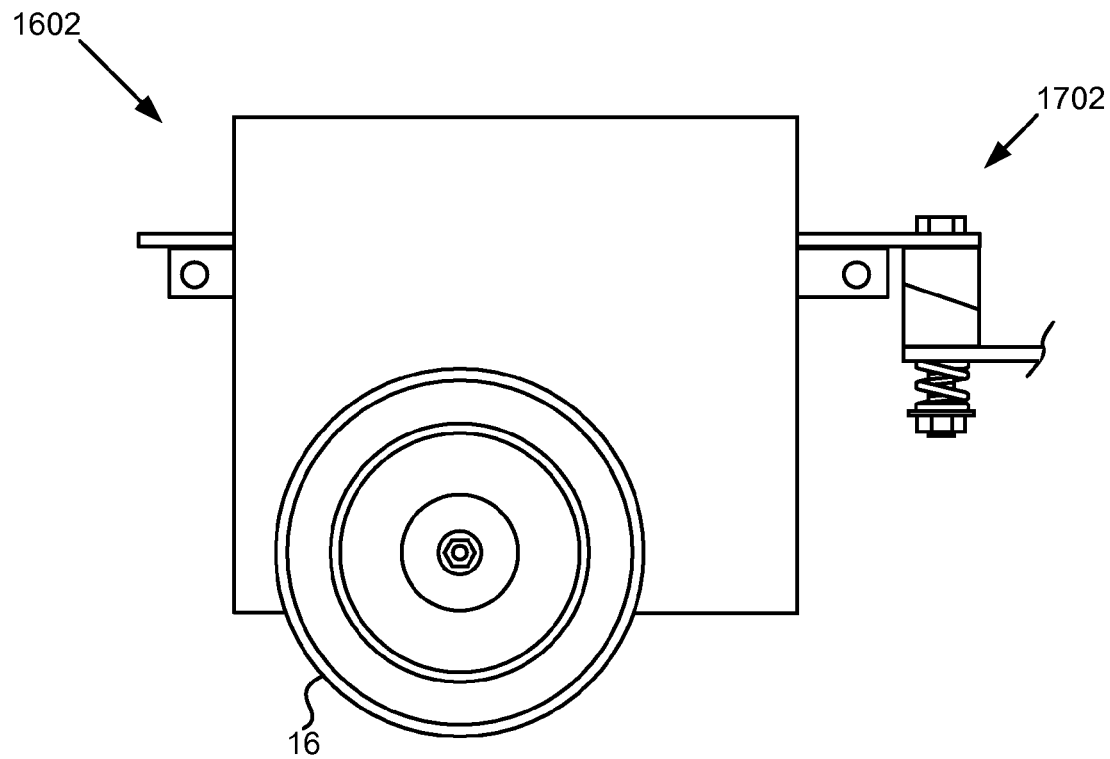
FIG. 17a is a schematic block diagram illustrating one embodiment of the power pack in accordance with the present invention.

FIG. 17a is a schematic block diagram illustrating one embodiment of the power pack 1602 in accordance with the present invention. The power pack 1602, as described above, comprises the wheels 16, 17. The wheels 16, 17 are configured to support the weight of both the power pack 1602 and the vehicle 1400. The power pack 1602 may include a hitch mechanism 1702 for coupling the power pack 1602 to the vehicle 1400.

Figure 17B:
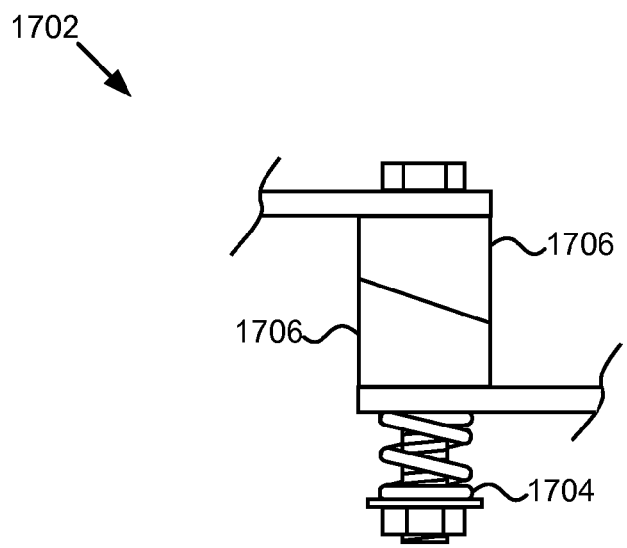
FIG. 17b is a schematic block diagram illustrating one embodiment of a hitch mechanism in accordance with the present invention

FIG. 17b is a schematic block diagram illustrating one embodiment a hitch mechanism 1702 that may be used in accordance with the present invention. The hitch mechanism 1702 may include a spring 1704 providing tension and maintaining a plurality of angled blocks 1706 in position. The angled blocks 1706 ensure that power pack 1602 tracks properly with regards to the vehicle 1400. Alternatively, traditional hitching mechanisms may be utilized in place of the depicted hitch mechanism 1702.

FIGS. 18a-c demonstrate different sources of energy and different transmissions the power pack 1602 may implement to provide the driving force necessary to move the vehicle 1400. FIG. 18a illustrates one embodiment of the power pack 1602 having a plurality of batteries 1802 for providing energy to a plurality of electric motors 1804. One electric motor 1804 may be coupled to one wheel 16, 17.

FIGS. 18b and 18c illustrate one embodiment of the power pack 1602 having a lead acid circular cell energy store connected to a single electric motor 1804. The electric motor 1804, in one embodiment, is connected to a continuously variable transmission (CVT) 1806. The CVT 1806 includes a primary clutch 1808 connected to the output shaft of the motor 1804 and a secondary clutch 1810 connected to the primary clutch by a belt 1812. CVTs 1806 are well known to those skilled in the art of both go-carts and snowmobiles, and therefore further discussion will not be given herein regarding the CVT 1806. Additionally, a motor may be used in place of the single electric motor.

In a further embodiment, the power pack 1602 may be configured to house multiple batteries in electrical communication with a single electric motor coupled to the rear wheel of the vehicle. Disposed between the motor and the rear wheel may be a CVT as described above or, alternatively, other suitable transmissions for electric motors.

Figure 19:
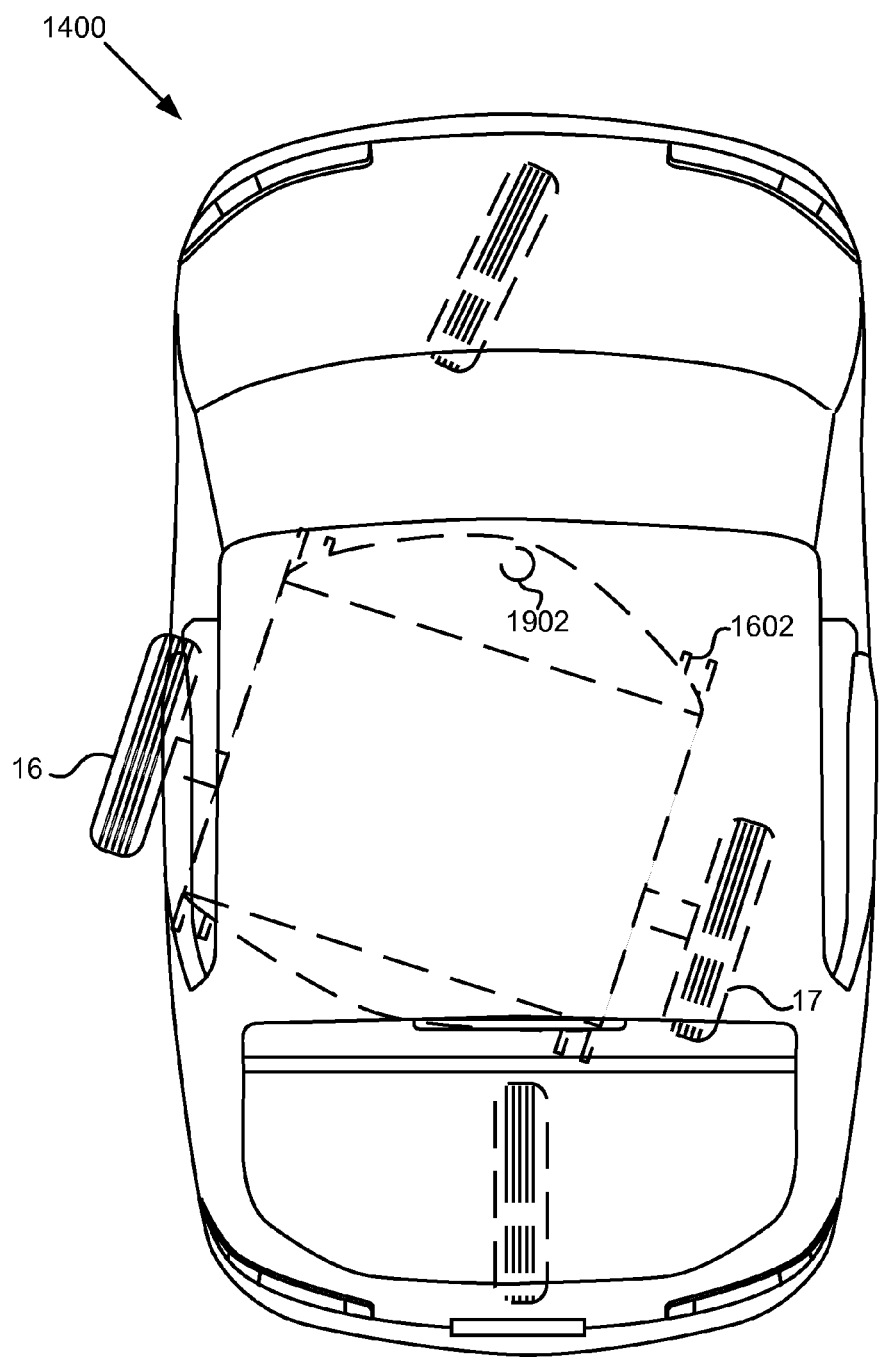
FIG. 19 is a schematic block diagram illustrating one embodiment of the vehicle in accordance with the present invention.

FIG. 19 is a schematic block diagram illustrating one embodiment of the vehicle 1400 in accordance with the present invention. In one embodiment, the power pack 1602 is configured to pivot about the hitch mechanism, or hitch point 1902 in response to the turn of the vehicle 1400. Such a configuration is useful when the wheels 16, 17 are coupled to a common energy source, and are not independently driven. For example, if the wheels 16, 17 are connected with a CVT 1806 which is in turn driven by a gas engine, it may not be feasible to turn the vehicle 1400 in a manner as described above with reference to FIGS. 1-13.

In the depicted embodiment, the power pack 1602 behaves in a manner similar to a trailer, following the lead of the front wheel 33. As the front wheel 33 turns left or right, the power pack 1602 subsequently follows. The power pack 1602 simultaneously supports the vehicle 1400 and provides the driving force of the vehicle 1400.

Figure 20:
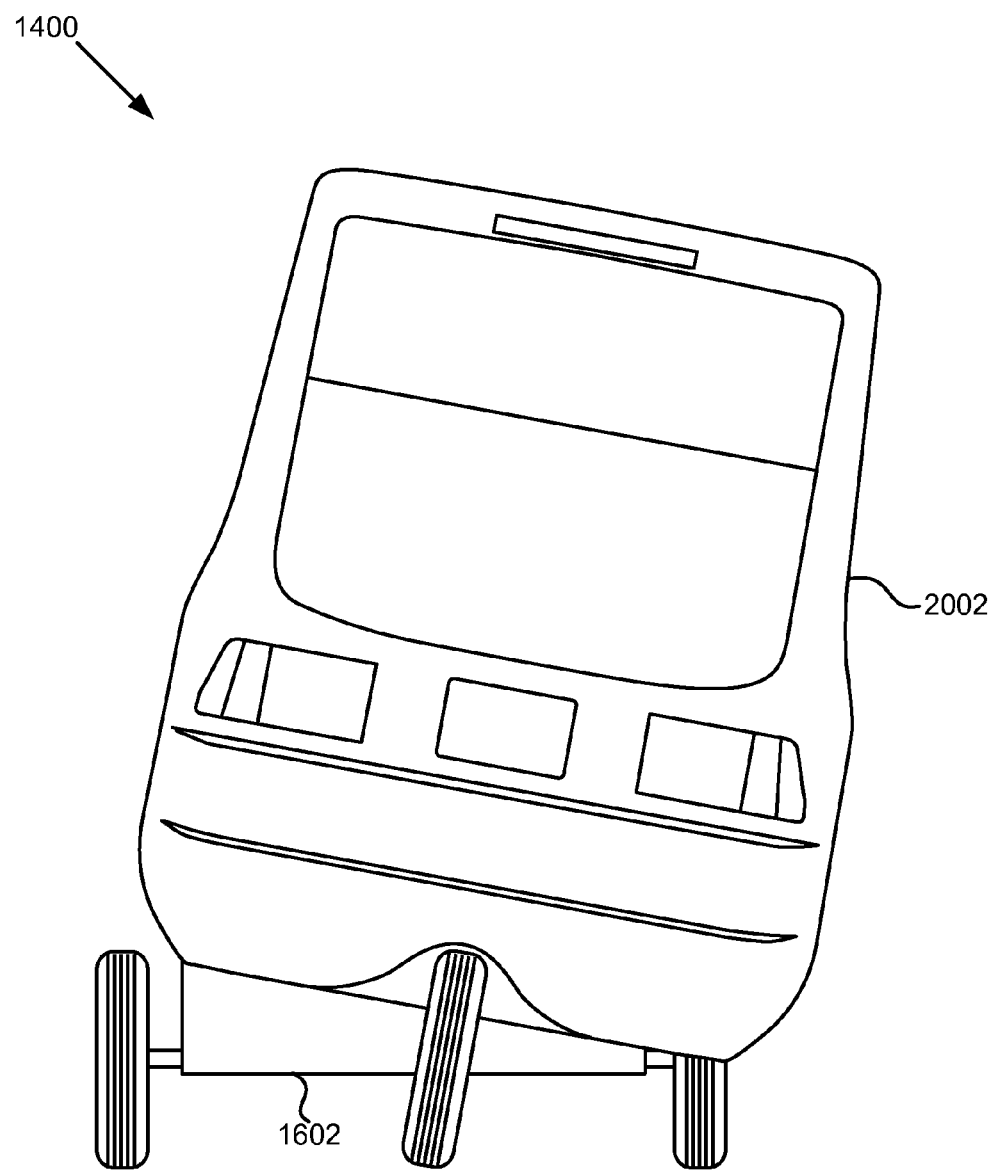
FIG. 20 is a perspective view diagram illustrating one embodiment of the vehicle having a tilt assist mechanism in accordance with the present invention.

FIG. 20 is a perspective view diagram illustrating one embodiment of the vehicle 1400 having a tilt assist mechanism in accordance with the present invention. In one embodiment, the vehicle 1400 is configured with a tilt system configured to adjust the roll of the body 2002 of the vehicle 1400. As used herein, the term "roll" refers to the tendency of a vehicle to tilt in a direction opposite the direction of lateral acceleration, or in other words, the tendency of a vehicle to lean to the outside of a turn.

The vehicle 1400, in one embodiment, may comprise an active tilt control system comprising a plurality of hydraulic pistons (not shown) configured to respond to commands from the vehicle control computer 60 and subsequently tilt the body 2002 in a direction corresponding to the lateral acceleration of the vehicle 1400. Alternative methods of tilting the body 2002 may be implemented, such as, but not limited to, airbags, adjustable spring rate suspension systems, adjustable stabilizer bar system, electrical actuators, etc.

In a further embodiment, the vehicle 1400 may comprise a passive tilt control system. The power pack 1602 may include a lateral pivoting mount coupling the power pack 1602 to the body 2002. The pivoting mount coupling may operate in a manner similar to the "truck" of a skate board. The yaw force created during a turn creates a "tilt" on the body 2002. For example, during a turn, the power pack 1602 shifts as depicted in FIG. 19. The shift of the power pack 1602 to one side causes the center of gravity of the vehicle 1400 to shift to the opposite side and subsequently lean to the inside of the turn because of the pivoting mount.

Figure 21:
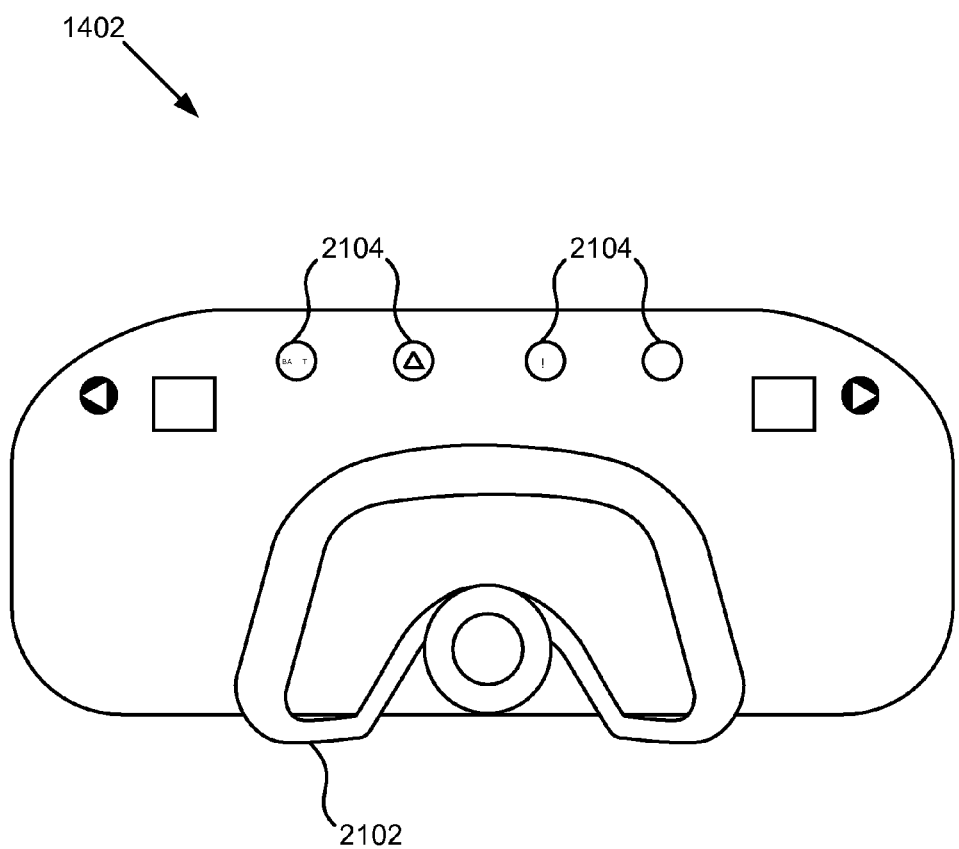
FIG. 21 is a schematic block diagram illustrating one embodiment of the drive console in accordance with the present invention.

FIG. 21 is a schematic block diagram illustrating one embodiment of the drive console 1402 in accordance with the present invention 1402. In one embodiment, the drive console 1402 may include a steering wheel 2102 and a plurality of sensor displays 2104. The steering wheel 2102 may be configured to receive control input from the user of the vehicle 1400. As described above with reference to FIG. 14. The sensors 2104 may include lights, dials, LED screens, etc., to indicate vehicle status.

Figure 22:
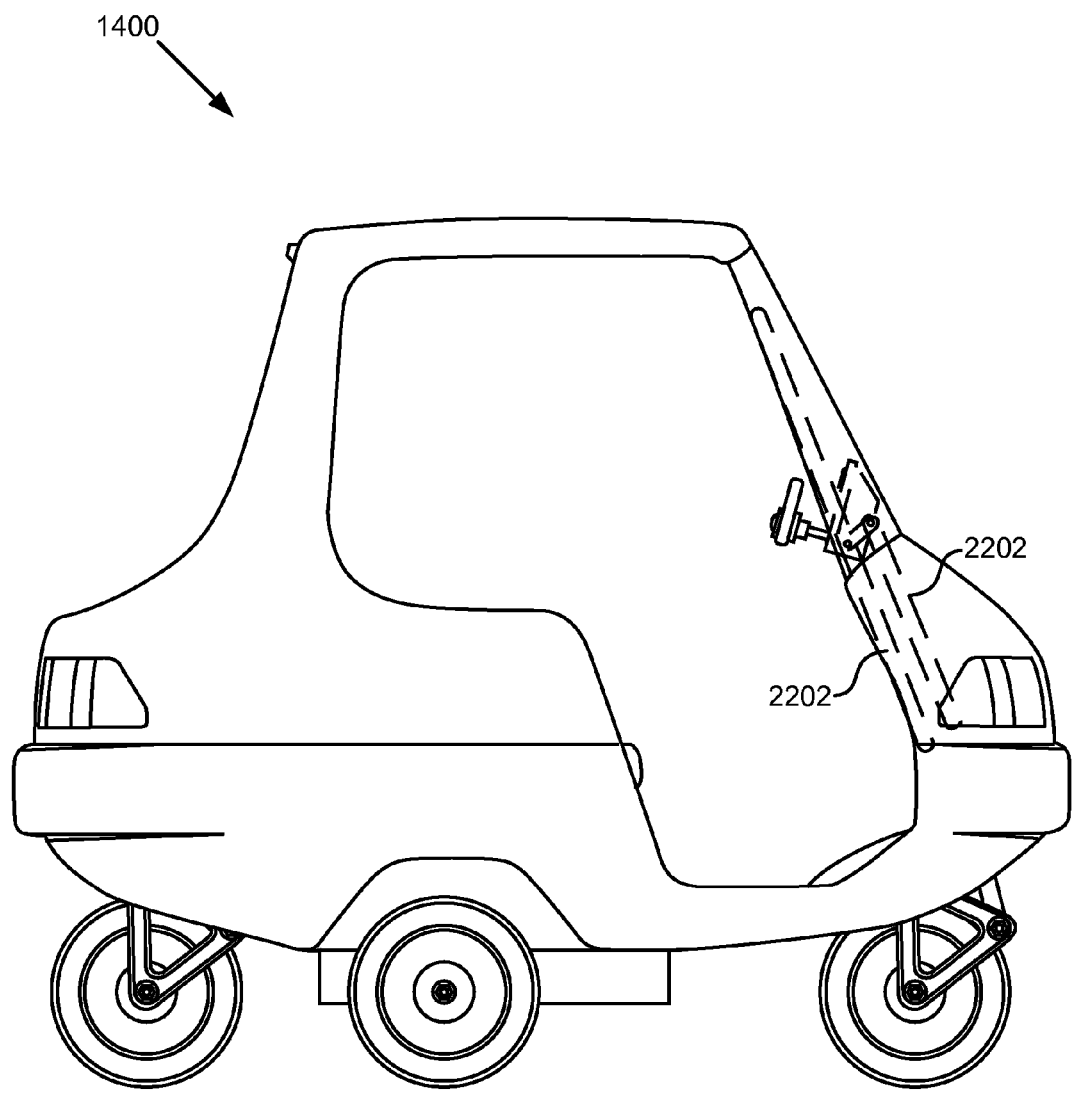
FIG. 22 is a schematic block diagram illustrating one embodiment of the vehicle having a rotatable drive console in accordance with the present invention.

FIG. 22 is a schematic block diagram illustrating one embodiment of the vehicle 1400 having a rotatable drive console 1402 in accordance with the present invention. As depicted, the drive console 1402 may be mounted on arms 2202 pivotally connected with the body of the vehicle 1400. The arms 2202 enable easier loading and unloading of passengers. In a further embodiment, the raised or rotated drive console 1402 allows a configuration of operation where the user may operate the vehicle 1400 in a standing position. In such a configuration, the drive console 1402 is rotated into a horizontal position where the steering wheel is facing upward.

Figure 23:
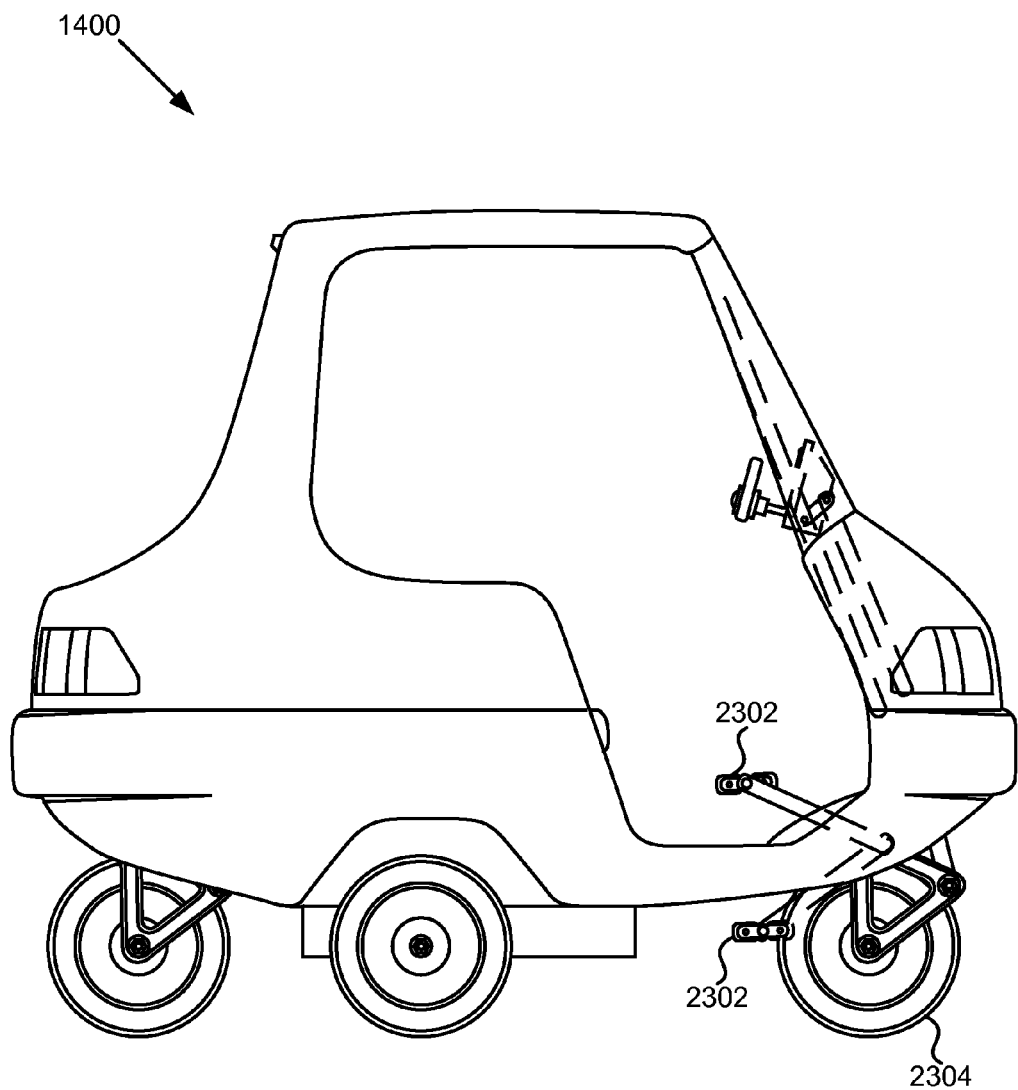
FIG. 23 is a schematic block diagram illustrating one embodiment of the vehicle having a manual propulsion system in accordance with the present invention.

FIG. 23 is a schematic block diagram illustrating one embodiment of the vehicle 1400 having a manual propulsion system in accordance with the present invention. In one embodiment, a floorboard (not shown) of the vehicle 1400 may be removed to expose a plurality of pedals 2302 for propelling the vehicle 1400. In the depicted embodiment, the pedals 2302 are operatively connected with a forward wheel 2304 of the vehicle 1400. In a standing position a user may pump the pedals 2302 in a manner similar to a stair machine in order to propel the vehicle 1400. Such a configuration is useful for traveling short distances where the vehicle 1400 may have exhausted the power pack 1602. In an alternative embodiment, the user may remain seated while propelling the vehicle 1400.

Figure 24A:
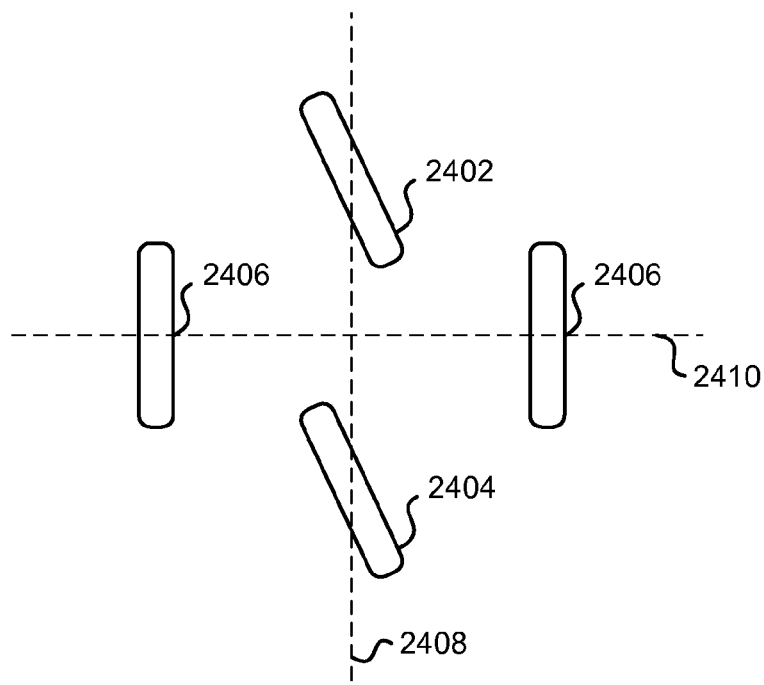
FIG. 24a is a schematic block diagram illustrating one embodiment of coordinated steering in accordance with the present invention.

FIG. 24a is a schematic block diagram illustrating one embodiment of coordinated steering in accordance with the present invention. In one embodiment, the front and rear wheels 2402, 2404 of the vehicle may be steered by the control computer (See FIG. 4) depending upon certain factors including current speed and/or drive mode.

At faster speeds, the control computer may turn the front and rear wheels 2402, 2404 in the same direction while maintaining the same attitude. The control computer is configured to determine at which speed the rear wheel switches from steering opposite the front wheel to steering in the same direction as the front wheel. This speed is determined based upon a number of factors including, but not limited to, vehicle size and weight, and the speed at which centrifugal force due to rear wheel steering is detrimental to the operation of the vehicle. Furthermore, the front wheel may be mechanically connected with the steering wheel so that in the event of a control computer failure, a user is still able to steer the vehicle.

In a further embodiment, the wheels 2402, 2404, 2406 may be arranged in a diamond pattern as illustrated. The front and rear wheel 2402, 2404, may be located along a longitudinal (from front to back of the vehicle) axis 2408. The side wheels 2406 may be located along a lateral axis 2410. The longitudinal and lateral axes 2408, 2410 may intersect in a central location beneath the vehicle, or alternatively at a point behind the vehicle. For example, the side wheels 2406 may be coupled with the power pack trailer of FIG. 17a.

Figure 24B:
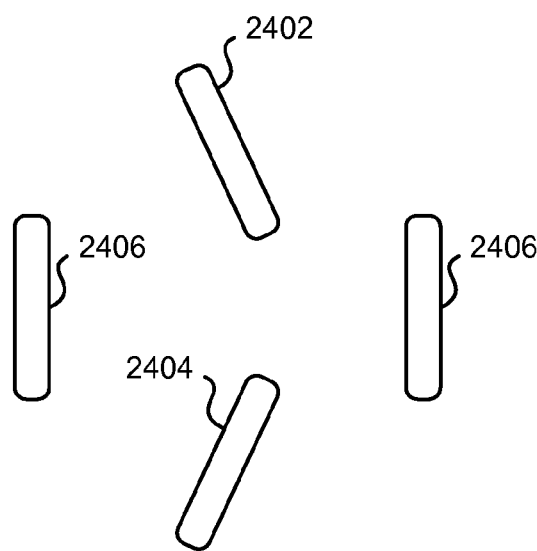
FIG. 24b is a schematic block diagram illustrating another embodiment of coordinated steering in accordance with the present invention.

FIG. 24b is a schematic block diagram illustrating another embodiment of coordinated steering in accordance with the present invention. At slower speeds, the front and rear wheel 2402, 2404 may be turned in opposite directions allowing the vehicle to turn in a very small radius.

Figure 25:
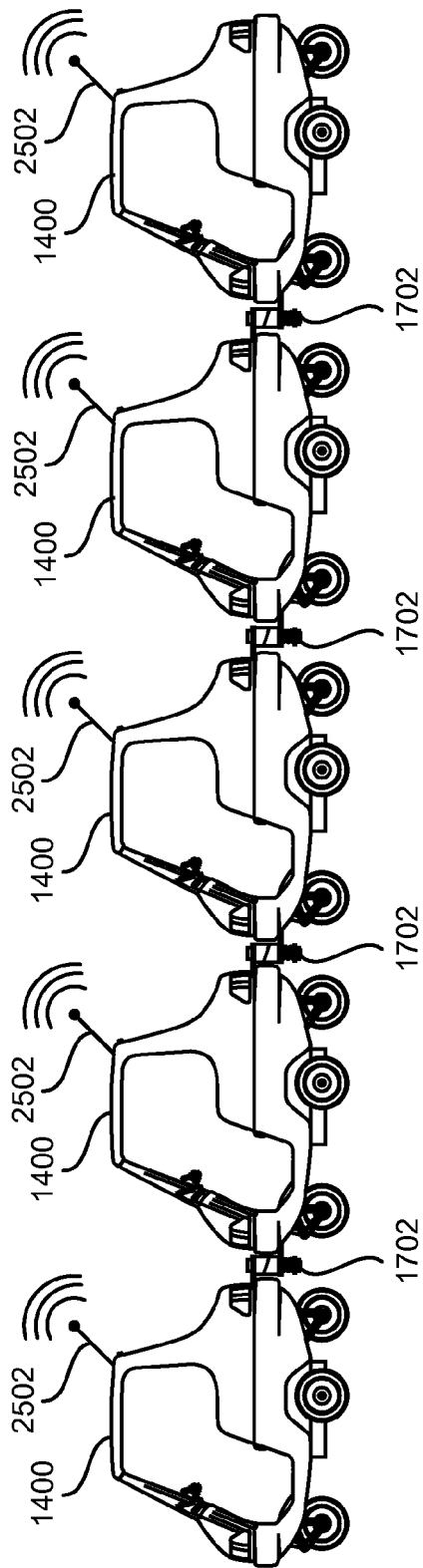
FIG. 25 is a side view diagram illustrating one embodiment of a plurality of coupled vehicles in accordance with the present invention.

FIG. 25 is a side view diagram illustrating one embodiment of a plurality of coupled vehicles 1400 in accordance with the present invention. In one embodiment, the vehicles 1400 may be coupled together in a manner similar to a train, using for example the hitch 1702 of FIG. 17b. In such a cooperative embodiment, each vehicle 1400 may provide a moving force in order to maneuver the plurality of vehicles 1400.

The vehicles 1400 may be controlled by a physical data connection that passes from one vehicle 1400 to the next through the hitches 1702, or alternatively the vehicles may receive control data wirelessly through an antenna 2502, for example. The control computer of one vehicle 1400 may be established as a master control computer for controlling the throttle, braking, and steering of each vehicle 1400.

Furthermore, the vehicle 1400 may be configured with network connectivity including, but not limited to, Wifi™, WiMax™, and cellular based data connections. This network connectivity allows an individual vehicle, or a plurality of vehicles, to be controlled remotely. Using TCP/IP sockets, control can be detached from the vehicle and logically attached to another node on the network. The control computer, therefore, can be located remotely and as such remotely control the vehicle.

Examples of functionality enabled by remote control include, but are not limited to, retrieving abandoned vehicles over the internet, remotely disabling a vehicle that is being improperly used, and disabling a vehicle that has gone outside a predefined allowable area.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle comprising:
a frame configured to support a vehicle, the frame having a longitudinal axis and a lateral axis, the lateral axis intersecting the longitudinal axis at a point;
a modular power pack removably coupled with the frame and configured to provide a driving force to the vehicle;
first and second wheels attached to the modular power pack along the lateral axis, third and fourth wheels attached to the frame along the longitudinal axis;
the first, second, third, and fourth wheels arranged in a diamond shape; and a control computer configured to coordinate steering of the third and fourth wheel in response to a current speed of the vehicle such that at a speed lower than a preselected speed the third and fourth wheel turn in opposite directions and at a speed greater than the preselected speed the third and fourth wheel turn in the same direction.

2. A vehicle comprising:
a frame configured to support a vehicle, the frame having a longitudinal axis and a lateral axis, the lateral axis crossing the longitudinal axis substantially at a vertical line through a center of gravity of the vehicle;
a modular power pack removably coupled with the frame and configured to provide a driving force to the vehicle;
first and second wheels attached to the modular power pack along the lateral axis, third and fourth wheels attached to the frame along the longitudinal axis; and the first, second, third, and fourth wheels arranged in a diamond shape, further comprising a single control apparatus coupled to the vehicle and in communication with a control computer, the single control apparatus comprising a moveable steering wheel configured to control throttle, steering, and braking.

3. The vehicle of claim 2, wherein the control computer accelerates the vehicle in response to the steering wheel moving towards a rear of the vehicle.

4. The vehicle of claim 2, wherein the control computer slows the vehicle in response to the steering wheel moving towards a front of the vehicle.

5. The vehicle of claim 2, wherein the control computer applies a park brake in response to the steering wheel rotating upward to a lifted position.

6. A vehicle comprising:
a frame configured to support a vehicle, the frame having a longitudinal axis and a lateral axis, the lateral axis intersecting the longitudinal axis at a point;
a modular power pack removably coupled with the frame and configured to provide a driving force to the vehicle;
first and second wheels attached to the modular power pack along the lateral axis, third and fourth wheels attached to the frame along the longitudinal axis;
the first, second, third, and fourth wheels arranged in a diamond shape; and
a single control apparatus coupled to the vehicle and in communication with a control computer, the single control apparatus comprising a moveable steering wheel configured to be rotated by a user to turn the vehicle, the steering wheel also configured to control throttle, steering, and braking.

7. The vehicle of claim 6, wherein the control computer accelerates the vehicle in response to the steering wheel moving towards a rear of the vehicle.

8. The vehicle of claim 6, wherein the control computer slows the vehicle in response to the steering wheel moving towards a front of the vehicle.

9. The vehicle of claim 6, wherein the control computer applies a park brake in response to the steering wheel rotating upward to a lifted position.

10. A vehicle comprising:
a frame configured to support a vehicle, the frame having a longitudinal axis;
a modular power pack pivotally and removably coupled with the frame and configured to provide power for a driving force to the vehicle;
first and second wheels attached to the modular power pack along a lateral axis, the lateral axis extending transversely to and crossing the longitudinal axis; and
third and fourth wheels attached to the frame along the longitudinal axis such that the lateral axis is located between the third and fourth wheels.

11. The vehicle of claim 10, further comprising an active tilt control system disposed between the frame and a body configured to tilt the body in response to lateral acceleration of the vehicle.

12. The vehicle of claim 11, wherein the active tilt control system comprises a tilting mechanism selected from the group consisting of hydraulic pistons, electrical actuators, airbags, adjustable spring rate suspensions, and adjustable stabilizer bar suspensions.

13. The vehicle of claim 10, further comprising at least one pedaling mechanism located beneath a removable floorboard, the pedaling mechanism coupled with the third wheel and configured to provide an emergency driving force to the vehicle.

14. The vehicle of claim 10, wherein the modular power pack is towed behind the vehicle.

15. The vehicle of claim 14, wherein the towed power pack provides the driving force by pushing the vehicle.

16. The vehicle of claim 10, wherein the modular power pack comprises a motor coupled with one of the third or fourth wheel.

17. The vehicle of claim 10, further comprising a single control apparatus coupled to the vehicle and in communication with a control computer, the single control apparatus comprising a moveable steering wheel configured to control throttle, steering, and braking.

18. The vehicle of claim 17, wherein the control computer accelerates the vehicle in response to the steering wheel moving towards a rear of the vehicle.

19. The vehicle of claim 17, wherein the control computer slows the vehicle in response to the steering wheel moving towards a front of the vehicle.

20. The vehicle of claim 17, wherein the control computer applies a park brake in response to the steering wheel rotating upward to a lifted position.

* * * * *